(12) United States Patent
Sakoda et al.

(10) Patent No.: US 6,195,534 B1
(45) Date of Patent: Feb. 27, 2001

(54) COMMUNICATION METHOD, TRANSMITTER, RECEIVER, WHEREIN SUBCARRIERS ARE USED TO TRANSMIT DIGITAL HEADER AND MESSAGE DATA IN A CELLULAR RADIO COMMUNICATIONS SYSTEM

(75) Inventors: Kazuyuki Sakoda, Tokyo; Mitsuhiro Suzuki, Chiba, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/114,896

(22) Filed: Jul. 14, 1998

(30) Foreign Application Priority Data

Jul. 16, 1997 (JP) ..................................... 9-191351

(51) Int. Cl.[7] ................................................. H04B 1/100
(52) U.S. Cl. .............................. 455/45; 455/59; 375/260
(58) Field of Search .............................. 455/45, 59, 60, 455/103; 370/203; 375/260

(56) References Cited

U.S. PATENT DOCUMENTS

| | | | |
|---|---|---|---|
| 4,615,040 | * 9/1986 | Mojoli | 375/40 |
| 4,881,241 | * 11/1989 | Pommier | 375/38 |
| 5,191,576 | * 3/1993 | Pommier | 370/50 |
| 5,274,629 | * 12/1993 | Helard | 370/50 |
| 5,828,650 | * 10/1998 | Malkamaki | 370/203 |

* cited by examiner

Primary Examiner—Daniel S. Hunter
Assistant Examiner—Nick Corsaro
(74) Attorney, Agent, or Firm—Jay H. Maioli

(57) ABSTRACT

A communication method, and a processing in accordance with the priority can be performed with a simple configuration even in the case of the communication of the multi-carrier method.

The sub-carriers on which high priority data is superimposed and the sub-carriers on which low priority data is superimposed are positioned alternately to be transmitted. At the receiving side, the reception symbol stream in which symbols are lined on the frequency axis is obtained by performing a predetermined reception processing. The delayed symbol stream in which the reception symbol stream is delayed for a predetermined time is added to the reception symbol stream to extract the signal components relating to the high priority data, so that the high priority data is decoded. Thus, the high priority data can be decoded promptly with a simple configuration, and a processing in accordance with the priority can be performed with a simple configuration even if the high priority data and the low priority data are transmitted at the same time by the multi-carrier method.

10 Claims, 10 Drawing Sheets

COMMUNICATION METHOD, TRANSMITTER, RECEIVER, WHEREIN SUBCARRIERS ARE USED TO TRANSMIT DIGITAL HEADER AND MESSAGE DATA IN A CELLULAR RADIO COMMUNICATIONS SYSTEM

BACKGROUND OF THE INVENTION

1. Field of the Invention

This invention relates to a communication method, a transmitter, a receiver, and a cellular radio communication system, and more particularly, is applicable to a portable telephone system.

2. Description of the Related Art

Conventionally, in the field of radio communication, a combination of high priority data and low priority data is generally transmitted. Such a typical digital radio communication system that a combination of high priority data and low priority data is transmitted will be explained below. In the following explanation, one frame of transmission data is composed of the high priority data and the low priority data, and the transmission data for one frame is transmitted by one transmission slot. Note that frame means data units in the processing of digital data, and slot means data units in the transmitting of digital data.

In this radio communication system, two types of information are transmitted by one frame as shown in FIG. 1, so as to divide one frame into a high priority field and a low priority field. The high priority data is stored in the high priority field and the low priority data is stored in the low priority field. In this case, not only information bits of the data are to be stored, but also error detection and correction bits are stored in each field. Thereby, the receiving side can detect and correct errors of the received information bits by using the error detection and correction bits.

In addition, the error detection and correction bits having superior ability to detect and correct errors are generally added to the high priority data, and the error detection and correction bits having a comparatively inferior ability to detect and correct errors are added to the low priority data. For this reason, the error detection and correction bits added to the high priority data tend to be longer in its size.

Here, FIG. 2 shows a transmitter for actually transmitting a frame having such structure. As shown in FIG. 2, in the transmitter 1, a bit stream DH1 composed of the high priority data is firstly input to a first error correction bit adding circuit 2, and a bit stream DL1 composed of the low priority data is input to a second error correction bit adding circuit 3.

The first error correction bit adding circuit 2 calculates the error detection and correction bits based on the input bit stream DH1 and adds these error detection and correction bits to the bit stream DH1 so as to generate a bit stream D1 which is stored in the aforesaid high priority field. The bit stream D1 is output to a frame generation circuit 4 at the subsequent stage. In connection, in the first error correction bit adding circuit 2, the error detection and correction bits having superior ability to detect and correct errors are calculated and added.

While, the second error correction bit adding circuit 3 calculates the error detection and correction bits based on the input bit stream DL1 and adds these error detection and correction bits to the bit stream DL1 so as to generate a bit stream D2 which is stored in the aforesaid low priority field. The bit stream D2 is output to a frame generation circuit 4 at the subsequent stage. In connection, in the second error correction bit adding circuit 3, the error detection and correction bits, which have inferior ability to detect and correct errors to the first error correction bit adding circuit 2, are calculated and added.

As shown in FIG. 2, the frame generation circuit 4 adds the bit stream D2 to the end of the bit stream D1 to generate transmission data stream D3 for one frame, which is output to a modulation circuit 5. The modulation circuit 5 modulates the transmission data stream D3 to generate transmission symbol stream D4, which is output to a transmission circuit 6. After performing the filtering processing on the transmission symbol stream D4, the transmission circuit 6 performs the digital-to-analog conversion processing to generate a transmission signal, and then performs the frequency conversion processing on the transmission signal to generate a transmission signal S1. This transmission signal S1 is transmitted via an antenna 7, so that the transmitter 1 transmits a combined data of the high priority data and the low priority data.

On the other hand, as shown in FIG. 3, in a receiver 10, the transmission signal S1 transmitted from the transmitter 1 is received at an antenna 11, and is input to a reception circuit 12 as a reception signal S2. The reception circuit 12, after performing the filtering processing on the reception signal S2, performs the frequency conversion processing on the reception signal S2 to take out a baseband signal, and performs the analog-to-digital conversion processing on the baseband signal to take out a reception symbol stream D5.

The demodulation circuit 13 performs a predetermined demodulating processing on the reception symbol stream D5 taken out by the reception circuit 12 to decode a reception data stream D6 (the reception data stream D6 is not completely equal to the transmission data stream D3, and includes data error received through transmission), which is output to a field division circuit 14. The field division circuit 14 divides the decoded reception data stream D6 into a bit stream D7 of the high priority field and a bit stream D8 of the low priority field, and outputs these bit streams D7 and D8 respectively to a first error detection and correction circuit 15 and a second error detection and correction circuit 16.

The first error detection and correction circuit 15 detects data errors included in the received information bits based on the error detection and correction bits included in the bit stream D7 and corrects the data errors, so that the transmitted information bits are decoded, and output as a bit stream DH2 of the high priority data. In the same way, the second error detection and correction circuit 16 detects data errors included in the received information bits based on the error detection and correction bits included in the bit stream D8 and corrects the data errors, so that the transmitted information bits are decoded, and output as a bit stream DL2 of the low priority data. By this processing, in the receiver 10, the high priority data and the low priority data are respectively decoded from the reception signal S2.

Transmitting a combination of the high priority data and the low priority data is also performed by the cellular radio communication system such as a portable telephone system. This point will be concretely explained below with an example of a portable telephone system.

Generally, in a portable telephone system, the area where communication service is provided is divided into cells of desired size, and a base station as a fixed radio station is positioned in each cell. A portable telephone device as a mobile radio station radio-communicates with the base station in the cell where the device exists, and so-called cellular radio communication system is constructed.

In such a portable telephone system, when a calling is made by a portable telephone device for example, the call processing is performed by the procedure explained below. The portable telephone device firstly transmits control data composed of preamble data and message data to a base station using a control channel called a random access channel (RACH). The base station monitors the random access channel and detects the existence of the preamble data to detect whether there is a message from the portable telephone device or not. When the preamble data is detected, the base station judges that there is a message from the portable telephone device, detects the following message data, and analyzes the contents of the message data. If the content of the message data is a call request, the base station determines a demesne control channel (DCCH) to be used for communication with the portable telephone device, and informs of this channel number to the portable telephone device via an answer governing channel (AGCH). A predetermined control processing is executed between the portable telephone device and the base station via the informed occupational control channel, so that a call processing from the portable telephone device is realized.

In the call processing, the control data initially sent from the portable telephone device is composed of preamble data and message data, as described above. In this case, the preamble data represents the existence of a message data. The base station side firstly detects the existence of the preamble data to detect whether a message data exists or not. Accordingly, in case that the base station side prioritizes the data based on the detection order, the preamble data has the highest priority and the message data showing the contents of a concrete request has lower priority than that of the preamble data.

Now, in the normal portable telephone system of the frequency division multiple access (FDMA) method or the time division multiple access (TDMA) method, to detect the preamble data corresponding to the high priority data, the preamble data is actually decoded not by decoding but by measuring electric power of the random access channel. On the contrary, in the portable telephone system of the code division multiple access (CDMA) method which is not based on the physical division by such as frequency or time but based on the division by the difference of spread codes, other signals are intermingled on the band. Thereby, simple measurement of electric power can not detect the preamble data, and the preamble data is resultantly decoded so as to detect the preamble data.

Here, this point will be described below with a concrete example. Note that control data is also generated in one frame in this case, and the control data is transmitted by one transmission slot.

As shown in FIG. 4, as for the data structure for one frame, the preamble field is generated in the first half of the frame and the information field is in the latter half. In this case, a preamble data is stored in the preamble field, and information bits forming a message data-and error detection and correction bits of the information bits are stored in the information field.

Here, FIG. 5 shows a transmitter for actually transmitting control data of such a data structure. As shown in FIG. 5, in the transmitter 20, a bit stream DP1 of preamble data is firstly input to a frame generation circuit 21, and a bit stream DM1 of message data is input to an error correction bit adding circuit 22.

The error correction bit adding circuit 22 calculates error detection and correction bits based on the input bit stream DM1, and adds them to the bit stream DM1 so as to generate a bit stream D11 to be stored in the aforesaid information field. The bit stream D11 is output to the frame generation circuit 21. The frame generation circuit 21 adds the bit stream D11 to the end of the bit stream DP1 of the preamble data as shown in FIG. 4 so as to generate a transmission data stream D12 for one frame, which is output to a modulation circuit 23.

The modulation circuit 23 performs a predetermined modulation processing on the transmission data stream D12 to generate a transmission symbol stream D13, which is output to a transmission circuit 24. After multiplying the transmission symbol stream D13 by a desired spread code and performing the filtering processing, the transmission circuit 24 performs the digital-to-analog conversion processing to generate a transmission signal. The transmission circuit 24 then performs the frequency conversion processing on the transmission signal to generate transmission signal S10 of a predetermined band. The transmission signal S10 obtained in this way is transmitted via an antenna 25, so that the transmitter 20 transmits the control data composed of preamble data and message data.

On the other hand, in a receiver 30, the transmission signal S10 transmitted from the transmitter 20 is received at an antenna 31, and is input to a reception circuit 32 as a reception signal S11, as shown in FIG. 6. After performing the filtering processing on the reception signal S11, the reception circuit 32 performs the frequency conversion processing on the reception signal S11 to take out a baseband signal, and performs the analog-to-digital conversion processing on the baseband signal to take out a reception symbol stream D14.

The demodulation circuit 33 performs a predetermined demodulation processing on the reception symbol stream D14 taken out by the reception circuit 32 to decode a reception data stream D15 (the reception data stream D15 is not completely equal to the transmission data stream D12, and includes data errors received through transmission), which is output to a field division circuit 34.

The field division circuit 34 divides the decoded reception data stream D15 into a bit stream D16 of preamble field and a bit stream D17 of information field, which are output to a preamble detection circuit 35 and an error detection and correction circuit 36 respectively. In connection, the field division circuit 34 divides the field by the time division method. More specifically, as shown in FIG. 4, the preamble field is temporally earlier than the information field, so that the field is divided by using this timing.

The preamble detection circuit 35 judges whether the bit stream D16 is a preamble data or not. If it is preamble data, the preamble detection circuit 35 outputs a control signal S12 to the error detection and correction circuit 36. The error detection and correction circuit 36 starts the error detection and correction processing to detect data errors included in the information bits of the received message data based on the error detection and correction bits included in the input bit stream D17, and corrects the data errors. As a result, if the information bits of the message data are correctly decoded, the error detection and correction circuit 36 outputs a bit stream DM2 of message data to a control circuit (not shown) for controlling communication sequence, etc. This allows the control circuit to recognize the reception of message data and control the communication sequence in accordance with the message data.

In connection, it has been described that the field is divided by the field division circuit 34. However, there is also another case where the preamble data at the head of the reception data D15 are simply detected without the field division for separating data, and if the preamble data is detected as a result, the error correction processing of next message data is performed.

In the conventional communication method, when transmitting a combination of a high priority data and a low priority data, although each data is processed individually, a processing of the same level is performed just separately without reflecting the priority.

In addition, in the conventional communication method, when transmitting control data using the random access channel for example, a preamble data is detected to confirm the existence of message data. This processing is accomplished easily since the preamble data and the message data are divided in the time direction. However, in communication of the multi-carrier method in which data to be transmitted are transmitted at the same time using a plurality of carriers, there is a problem that such processing in time direction can not be performed since the preamble data and the message data are not divided in time direction.

Accordingly, in the case where a control data composed of a preamble data and a message data are transmitted by the multi-carrier method communication, it can be generally considered that the signal components of the preamble data and the signal components of the message data are extracted by dividing them in frequency direction at the receiving side, so that the respective data are decoded. However, this method needs a high-precision filter for dividing the signal components of the preamble data and the signal components of the message data, so that the configuration of the device at the receiving side tends to be complicated.

SUMMARY OF THE INVENTION

In the view of the foregoing, an object of this invention is to provide a communication method in which the processing in accordance with the priority can be performed with a simple configuration even if the high priority data and the low priority data are transmitted at the same time by the multi-carrier method, and to provide a transmitter, a receiver and a cellular radio communication system which use the communication method.

The foregoing object and other objects of the invention have been achieved by the provision of a communication method for transmitting a high priority data and a low priority data at the same time using a plurality of sub-carriers. In the communication method, a transmission signal in which the sub-carriers having the high priority data superimposed and the sub-carriers having the low priority data superimposed are positioned alternately is transmitted. At the receiving side, a predetermined reception processing is performed on the transmission signal to obtain reception symbol stream being the alignment of symbols on the frequency axis, and the signal components of the high priority data is extracted by adding the delayed symbol stream which is the reception symbol stream delayed for a predetermined time to the reception symbol stream, so that the high priority data is decoded. The Fourier transform processing is performed on the reception symbol stream to obtain a symbol stream being the alignment of symbols on the time axis, and the symbols of the low priority data is extracted from the symbol stream so that the low priority data is decoded.

Further, according to this invention, a transmitter for transmitting a high priority data and a low priority data at the same time using a plurality of sub-carriers is provided with transmitting means for transmitting transmission signal in which the sub-carriers having the high priority data superimposed and the sub-carriers having the low priority data superimposed are positioned alternately.

Further, according to this invention, a receiver for receiving a transmission signal transmitted from a transmitter which transmits a high priority data and a low priority data at the same time using a plurality of sub-carriers is provided with: receiving means for obtaining a reception symbol stream being the alignment of symbols on the frequency axis by performing a predetermined reception processing on the transmission signal in which the sub-carriers having the high priority data superimposed and the sub-carriers having the low priority data superimposed are positioned alternately; first demodulating means for extracting the signal components of the high priority data by adding the delayed symbol stream which is the reception symbol stream delayed for a predetermined time to the reception symbol stream so that the high priority data is decoded; and second demodulating means for performing the Fourier transform processing on the reception symbol stream to obtain symbol stream being the alignment of symbols on the time axis, and for extracting the symbols of the low priority data from the symbol stream so that the low priority data is decoded.

Further, according to this invention, in a cellular radio communication system in which a predetermined area is divided into cells of desired size, a base station is provided for each cell, and a mobile station radio-communicates with the base station in the cell where the mobile station exists, the mobile station transmits a transmission signal, which has the sub-carriers on which a message data is superimposed and the sub-carriers on which a preamble data representing the existence and attribute of the message data is superimposed are positioned alternately, through a random access channel. The base station performs a predetermined reception processing on the transmission signal to obtain a reception symbol stream being the alignment of symbols on the frequency axis, and extracts the signal components of the preamble data by adding the delayed symbol stream which is the reception symbol stream delayed for a predetermined time to the reception symbol stream so that the preamble data is detected based on the signal component. After the existence and attribute of the message data are confirmed by the detection of the preamble data, the Fourier transform processing is performed on the reception symbol stream to obtain a symbol stream being the alignment of symbols on the time axis, and the symbols of the message data are extracted from the symbol stream so that the message data is decoded.

Further, according to this invention, in a cellular radio communication system in which a predetermined area is divided into cells of desired size, a base station is provided for each cell, and a mobile station radio-communicates with the base station in the cell where the mobile station exists, the base station transmits a transmission signal, which has the sub-carriers on which a message data is superimposed and the sub-carriers on which a preamble data representing the existence and attribute of the message data is superimposed are positioned alternately, through a random access channel. The mobile station performs a predetermined reception processing on the transmission signal to obtain a reception symbol stream being the alignment of symbols on the frequency axis, and extracts the signal components of the preamble data by adding the delayed symbol stream which is the reception symbol stream delayed for a predetermined time to the reception symbol stream so that the preamble data is detected based on the signal component. After the existence and attribute of the message data are confirmed by the detection of the preamble data, the Fourier transform processing is performed on the reception symbol stream to obtain a symbol stream being the alignment of symbols on the time axis, and the symbols of the message data are extracted from the symbol stream so that the message data is decoded.

In this way, the sub-carriers on which a high priority data is superimposed and the sub-carriers on which a low priority data is superimposed are positioned alternately to be transmitted. At the receiving side, a reception symbol stream being the alignment of symbols on the frequency axis is obtained by a predetermined reception processing, and the signal components of the high priority data are extracted by adding the delayed symbol stream which is the reception symbol stream delayed for a predetermined time to the reception symbol stream, so that the high priority data is decoded. Thereby, the high priority data can be decoded promptly, and even if the high priority data and the low priority data are transmitted at the same time by the multi-carrier method, a processing according to the priority can be performed with a simple configuration.

Similarly, in a cellular radio communication system, the sub-carriers on which a message data is superimposed and the sub-carriers on which a preamble data representing the existence and attribute of the message data is superimposed are positioned alternately to be transmitted. At the receiving side, a reception symbol stream being the alignment of symbols on the frequency axis is obtained by a predetermined reception processing, and the signal components of the preamble data are extracted by adding the delayed symbol stream which is the reception symbol stream delayed for a predetermined time to the reception symbol stream, so that the preamble data is detected based on the signal components. After the existence and attribute of the message data are confirmed by the detection of the preamble data, the Fourier transform a processing is performed on the reception symbol stream to obtain a symbol stream being the alignment of symbols on the time axis, and the symbols of the message data are extracted from the symbol stream, so that the message data is decoded. Thereby, the preamble data can be detected promptly with a simple configuration, and even if the preamble data and the message data are transmitted at the same time by the multi-carrier method, a processing according to the priority can be performed with a simple configuration.

The nature, principle and utility of the invention will become more apparent from the following detailed description when red in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) The First Embodiment (1-1) The Frame Structure

Figure 1:
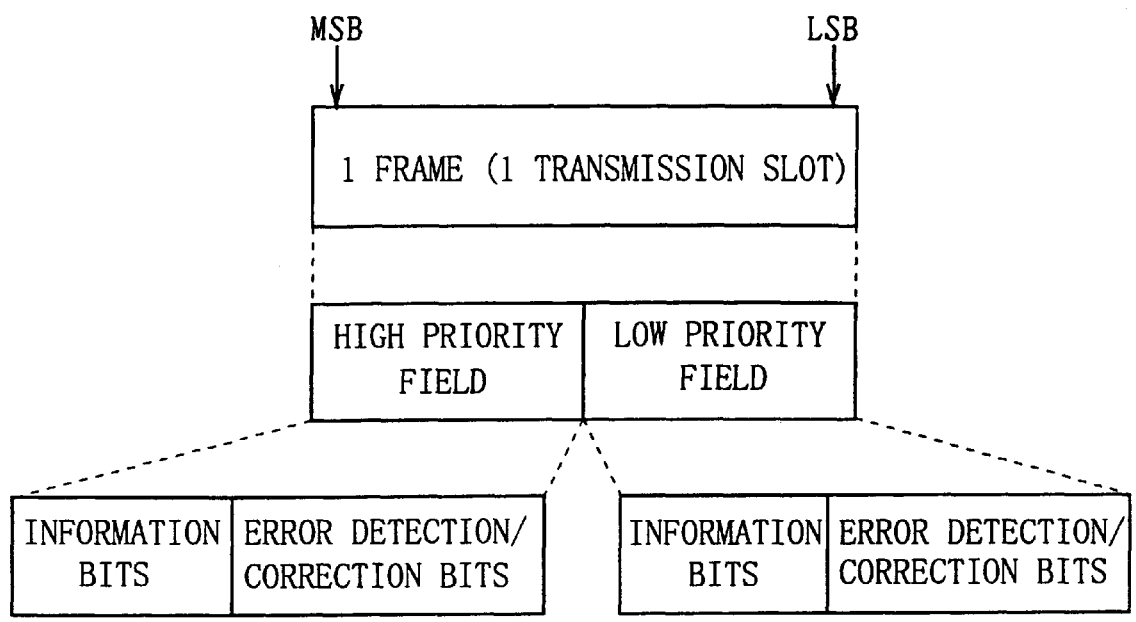
FIG. 1 is a schematic diagram showing the frame structure of a conventional communication system.
Figure 2:
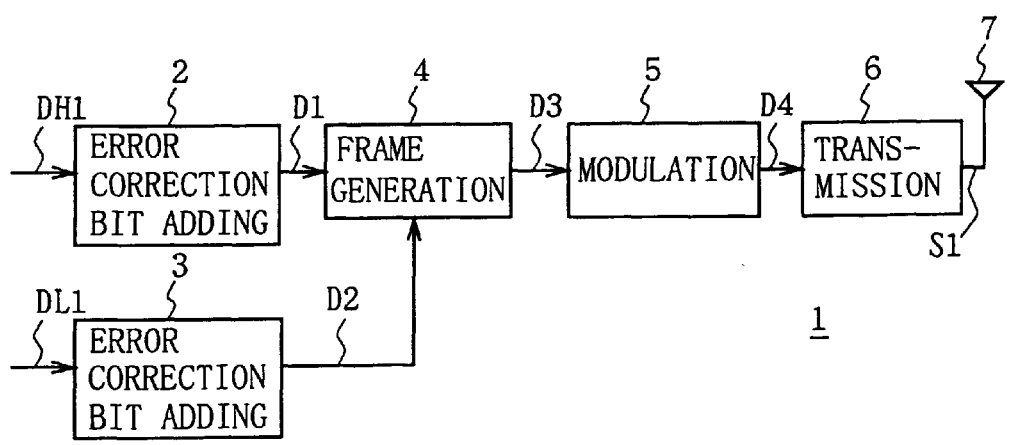
FIG. 2 is a block diagram showing the transmitter of the conventional communication system.
Figure 3:
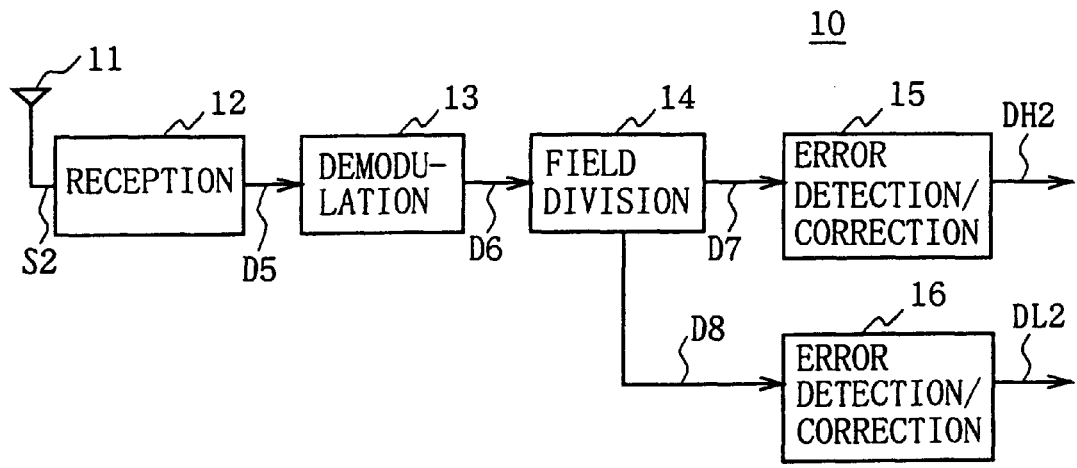
FIG. 3 is a block diagram showing the receiver of the conventional communication system.
Figure 4:
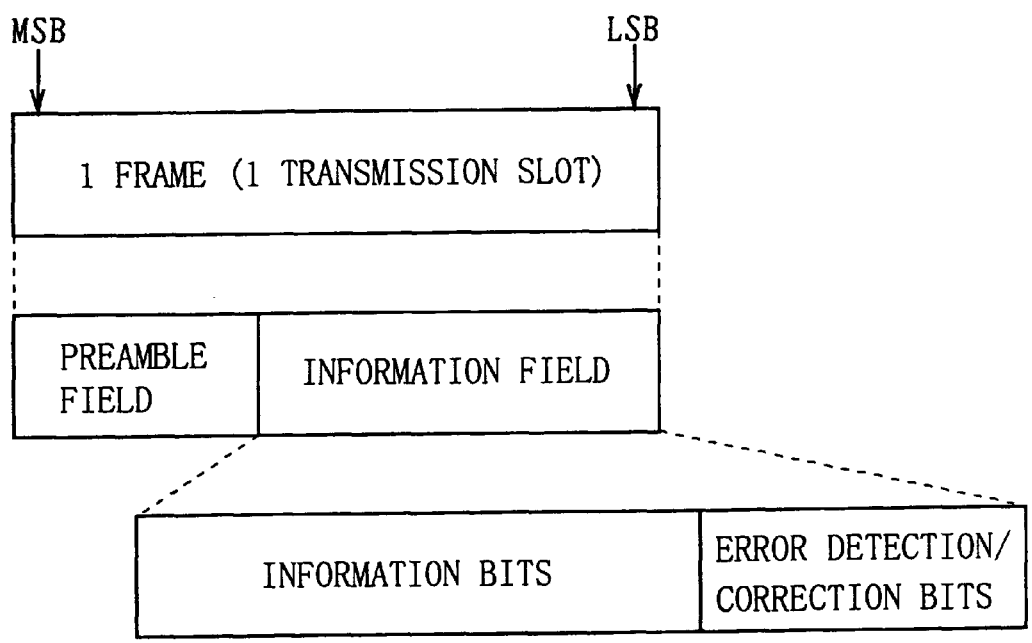
FIG. 4 is a schematic diagram showing the frame structure when transmitting control data in the conventional portable telephone system.
Figure 5:
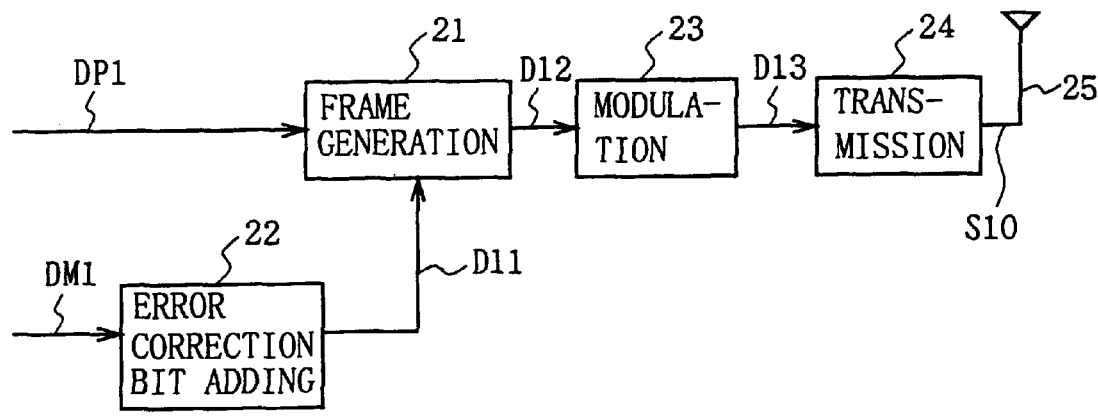
FIG. 5 is a block diagram showing the configuration of the conventional transmitter for transmitting the control data.
Figure 6:
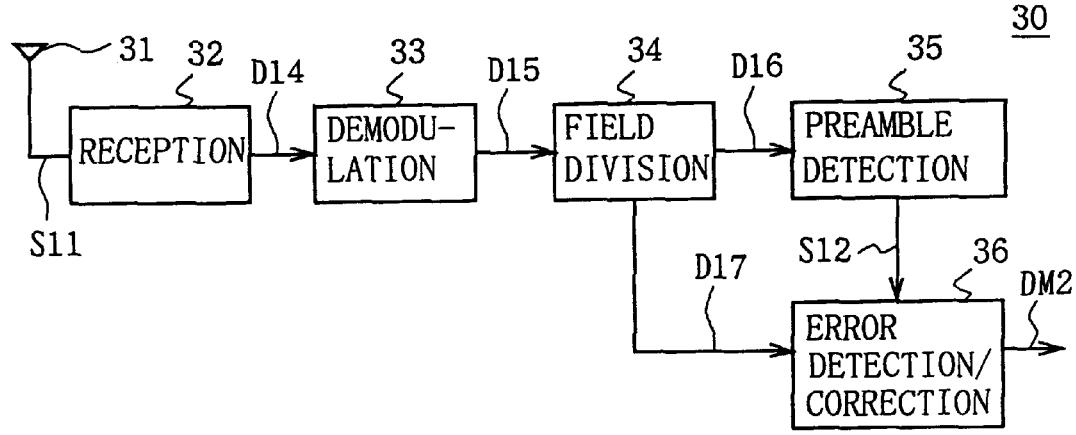
FIG. 6 is a block diagram showing the configuration of the conventional receiver for receiving the control data.
Figure 7:
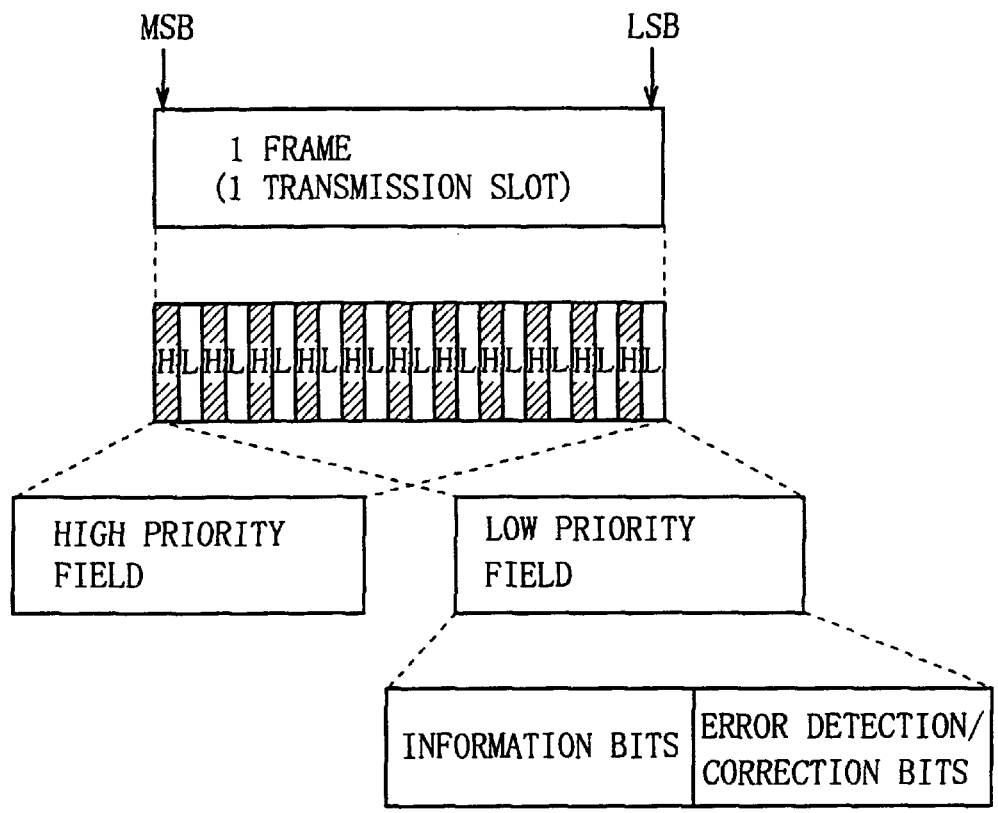
FIG. 7 is a schematic diagram illustrating the frame structure of a communication system according to the first embodiment.

The frame structure of the communication system according to this invention will be explained in this paragraph. In the communication system according to this invention, high priority data and low priority data are transmitted for one frame. At this time, as shown in FIG. 7, the transmission symbols of the high priority data and the transmission symbols of the low priority data are positioned in the frame alternately. That is, when the transmission symbols are collected alternately, they become a high priority field being the high priority data, and when the remained symbols are collected, they become a low priority field being the low priority data.

In this case, the low priority field stores the transmission symbols generated from the information bits of the low priority data and the transmission symbols generated from the error detection and correction bits which are added to the low priority data. On the other hand, the high priority field stores only the transmission symbols generated from the information bits of the high priority data, but not the transmission symbols generated from the error detection and correction bits. In this connection, the high priority transmission symbols are symbols generated based on the coded bits which are generated by performing the extending processing of a distance between series using the convolutional coding and/or by performing the orthogonal processing between series using the M-ary modulation on the information bits of the high priority data. The error detection and correction bits are not added to the high priority data, but the processing for extending a distance between series and the orthogonal processing between series are performed, so that the high priority data can be decoded promptly by the correlation detection at the receiving side.

(1-2) The Carrier Structure

Figure 8:
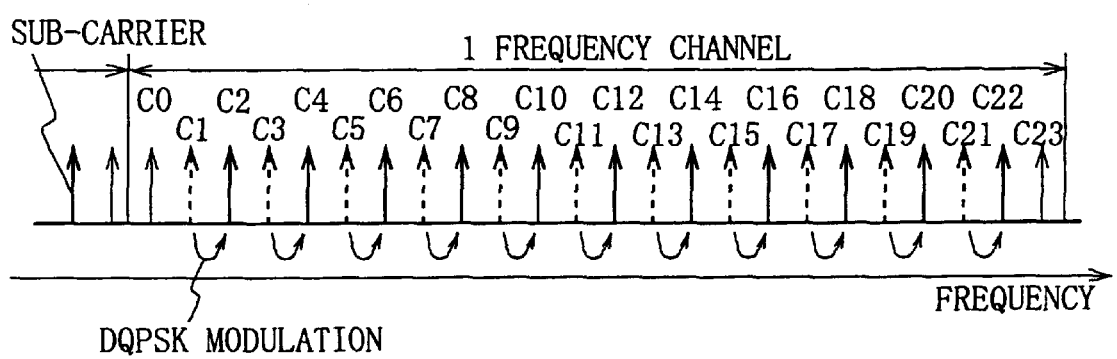
FIG. 8 is a schematic diagram showing the sub-carrier structure of the communication system.

The communication system according to this invention performs so-called multi-carrier communication for transmitting transmission symbols for one frame having the above-mentioned structure at the same time within one modulation period using a plurality of sub-carriers. More specifically, as shown in FIG. 8, one frequency channel is composed of twenty-four sub-carriers C0 to C23 positioned on the frequency axis at the same intervals. Twenty-two sub-carriers C1 to C22, excepting sub-carriers C0 and C23 at both sides of the twenty-four sub-carriers C0 to C23 which are guard carriers, are used to transmit the transmission symbols for one frame. In the communication system, the transmission symbols transmitted within one modulation period are thereby transmitted being lined on the frequency axis.

In addition, for convenience, the following explanation is on condition that each transmission symbol is symbol-mapped by, for example, the quadrature phase shift keying (QPSK) modulation and one transmission symbol is assigned to each of sub-carriers C1 to C22 to be transmitted.

In the communication system, the transmission symbols having the frame structure shown in FIG. 7 are successively assigned to each of a plurality of sub-carriers C1 to C22 one by one. Accordingly, the odd-numbered sub-carriers C1, C3, C5, C7, C9, C11, C13, C15, C17, C19, and C21 are used to transmit the high priority transmission symbols, and the even-numbered sub-carriers C2, C4, C6, C8, C10, C12, C14, C16, C18, C20, and C22 are used to transmit the low priority transmission symbols.

In connection, the high priority transmission symbols are symbols generated by performing the QPSK modulation on the coded bits which are generated by performing the extending processing of a distance between series using the convolutional coding and/or by performing the orthogonal processing between series using the M-ary modulation on the information bits of the high priority data. The high priority transmission symbols are assigned to the sub-carriers C1, C3, C5, C7, C9, C11, C13, C15, C17, C19 and C21 as they are.

On the contrary, the low priority transmission symbols are symbols generated by performing the QPSK modulation on the information bits of the low priority data and the error detection and correction bits added to the information bits. To assign these symbols to sub-carriers, the differential phases between the low priority transmission symbols and the former high priority transmission symbols are assigned to the sub-carriers C2, C4, C6, C8, C10, C12, C14, C16, C18, C20, and C22. More specifically, after applied the differential quadrature phase shift keying (DQPSK) modulation respectively, the low priority transmission symbols are assigned to the sub-carriers C2, C4, C6, C8, C10, C12, C14, C16, C18, C20 and C22.

(1-3) The Configuration of Transmitter

Figure 9:
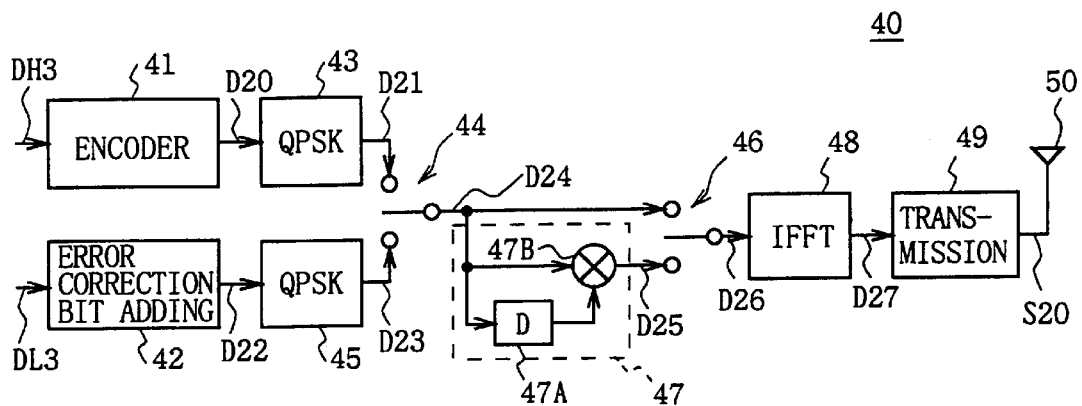
FIG. 9 is a block diagram showing the configuration of a transmitter of the communication system.

Next, a transmitter of the communication system according to this invention will be explained in this paragraph. In FIG. 9, 40 shows a transmitter of the communication system according to this invention as a whole. A bit stream DH3 of the high priority data is input to an encoder 41 and a bit stream DL3 of the low priority data is input to an error correction bit adding circuit 42.

The encoder 41 codes the bit stream DH3 of the input high priority data by performing, for example, the extending processing of a distance between series by the convolutional coding and the orthogonal processing between series by the M-ary modulation. The resultant coded bit stream D20 is output to a QPSK modulation circuit 43. The QPSK modulation circuit 43 performs the QPSK modulation processing on the input coded bit stream D20 successively, so as to generate a transmission symbol stream D21, which is output to the first terminal of a selection switch 44 at the subsequent stage.

On the other hand, the error correction bit adding circuit 42 calculates error detection and correction bits based on the input low priority bit stream DL3, and adds the resulting error detection and correction bits to the bit stream DL3 to generate the bit stream D22 on which a processing for error correction is performed. The bit stream D22 is output to a QPSK modulation circuit 45 at the subsequent stage. The QPSK modulation circuit 45 applies QPSK modulation to the input bit stream D22 successively to generate the transmission symbol stream D23, which is output to the second input terminal of the first selection switch 44 at the subsequent stage.

The first selection switch 44 changes the connection of the input terminal alternately to select the transmission symbols supplied to the first input terminal and the transmission symbols supplied to the second input terminal alternately, so as to generate a symbol stream D24 in which the high priority data and the low priority data are lined alternately as shown in FIG. 7. The symbol stream D24 is input to the first input terminal of a second selection switch 46, and is input to a delay circuit 47A and a multiplier 47B which consist of a differential modulation circuit 47.

The differential modulation circuit 47 differential-modulates the currently input transmission symbol by multiplying the currently input transmission symbol and the one previous transmission symbol obtained through the delay circuit 47A by the multiplier 47B. This processing is successively repeated so as to generate a differential symbol stream D25, which is output to the second input terminal of the second selection switch 46.

When the symbol stream D24 is odd-numbered, the second selection switch 46 selects the odd-numbered symbol of the symbol stream D24 by connecting to the first input terminal. When the differential symbol stream D25 is even-numbered, the second selection switch 46 selects the even-numbered symbol of the differential symbol stream D25 by connecting to the second input terminal. The resultant symbol stream D26 is output to an inverse fast Fourier transform (IFFT) circuit 48 at the subsequent stage. In this case, the odd-numbered symbols of the symbol stream D24 and the differential symbol stream D25 are the high priority transmission symbols, and the even-numbered symbols are the low priority transmission symbols. Thereby, if the symbol stream D24 and the differential symbol stream D25 are selected alternately by the second selection switch 46, the symbol stream D26 in which the high priority transmission symbols and the differential-modulated low priority transmission symbols are alternately lined can be obtained. Note that the low priority transmission symbols are differential-modulated based on the high priority transmission symbols since they are differential-modulated to the one previous symbol.

The inverse fast Fourier transform circuit 48 performs the inverse fast Fourier transform processing on the symbol stream D26 to generate a signal in which symbols lined on the time axis are arranged on the frequency axis. That is, the inverse fast Fourier transform circuit 48 allocates each symbol of the symbol stream D26 to each of the sub-carriers C1 to C22 successively. The transmission symbol stream D27 generated by the processing of the inverse fast Fourier transform circuit 48 is input to a following transmission circuit 49.

The transmission circuit 49 performs the window processing and the filtering processing on the transmission symbol stream D27, and further performs the digital-to-analog conversion processing to generate a transmission signal. The transmission circuit 49 then performs the frequency conversion processing on the transmission signal to generate the transmission signal S20 of a predetermined frequency channel, which is transmitted via an antenna 50. In this way, the transmission signal S20 in which the high priority data and the low priority data are superimposed alternately on the sub-carriers C1 to C22 is transmitted from the transmitter 40.

(1-4) The Configuration of Receiver

Figure 10:
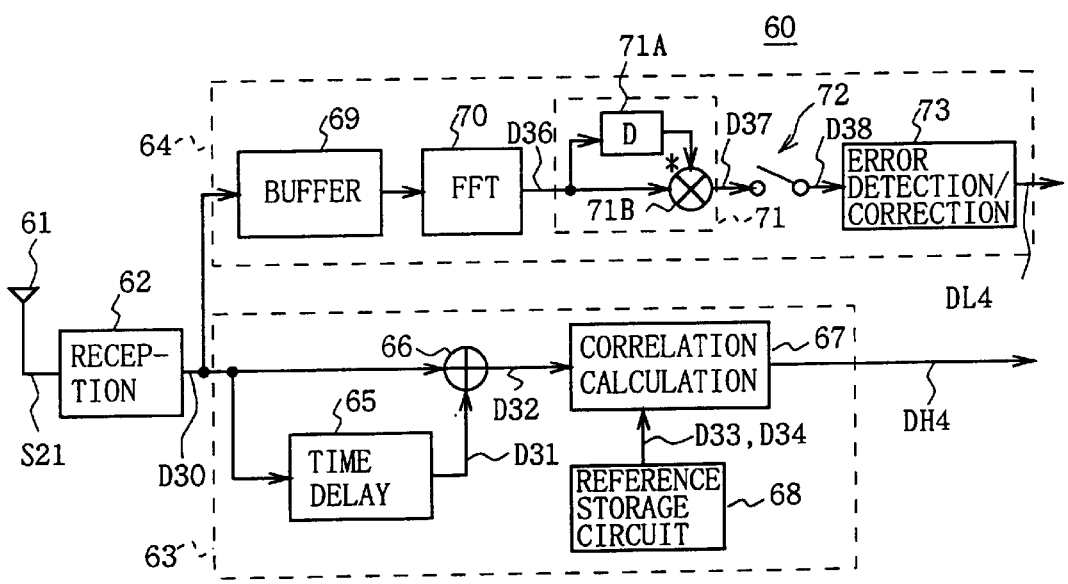
FIG. 10 is a block diagram showing the configuration of a receiver of the communication system.

A receiver of the communication system according to this invention will be explained in this paragraph. In FIG. 10, 60 shows a receiver of the communication system according to this invention, which receives transmission signal S20 transmitted from the transmitter 40 by an antenna 61 and inputs this to a reception circuit 62 as a reception signal S21. The reception circuit 62 performs the filtering processing and then the frequency conversion processing on the reception signal S21 to obtain a baseband signal. The reception circuit 62 performs the analog-to-digital conversion processing on the baseband signal to obtain a reception symbol stream D30, and performs the window processing on the reception symbol stream D30 for one modulation period, thereafter outputs this to first and second demodulating units 63 and 64. In connection, since the Fourier transform processing is not performed, the reception symbol stream D30 is a symbol stream in which each symbol is lined on the frequency axis.

Figure 11A:
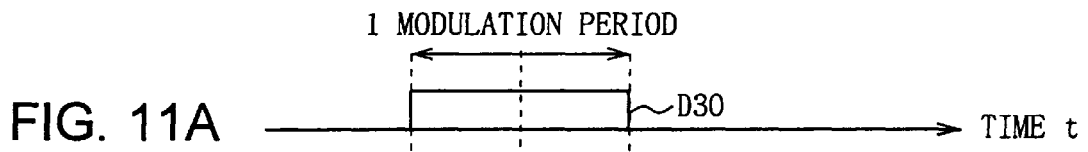
FIGS. 11A, 11B and 11C are schematic diagrams explaining the time delay and adding processing in the receiver.
Figure 11B:
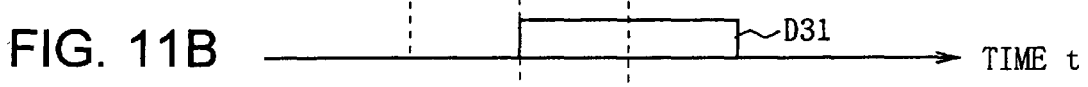

The first demodulating unit 63 is a demodulating unit for demodulating the high priority data, and inputs the reception symbol stream D30 to an internal time delay circuit 65 and adder 66 respectively. In the time delay circuit 65, as shown in FIGS. 11A and 11B, the reception symbol stream D30 of one modulation period T received by the reception circuit 62 is delayed for a half of one modulation period T, that is T/2, and the resultant reception symbol stream D31 is output to the adder 66.

Figure 11C:
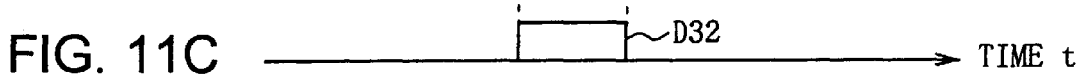

The adder 66 adds the reception symbol stream D30 and the reception symbol stream D31 for the period T/2 after the supplying of the reception symbol stream D31 starts. Thereby, as shown in FIG. 11C, the adder 66 generates a symbol stream D32 in which the latter half of the reception symbol stream D30 and the former half of the reception symbol stream D31 are added, and the symbol stream D32 is output to a correlation calculation circuit 67.

In connection, when the reception symbol stream D31 is generated by delaying the reception symbol stream D30 for a half period T/2 of one modulation period T and the reception symbol stream D31 are added to the reception symbol stream D30 thus, among the signal components of the sub-carriers C1 to C22 shown in FIG. 8, the signal components of the even-numbered sub-carriers C2, C4, C6, C8, C10, C12, C14, C16, C18, C20 and C22 are negated, and only the signal components of the odd-numbered sub-carriers C1, C3, C5, C7, C9, C11, C13, C15, C17, C19 and C21 can be extracted.

Figure 12A:
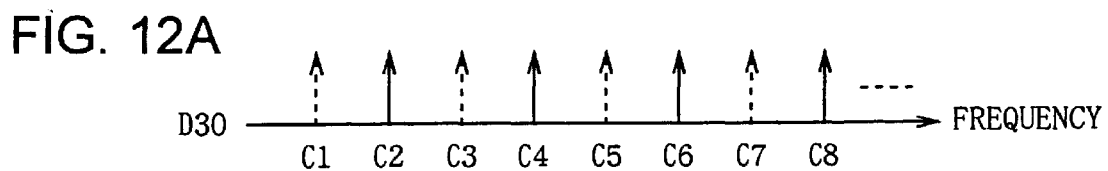
FIGS. 12A and 12B are schematic diagrams explaining the principle of the signal extraction by the adding processing.
Figure 12B:
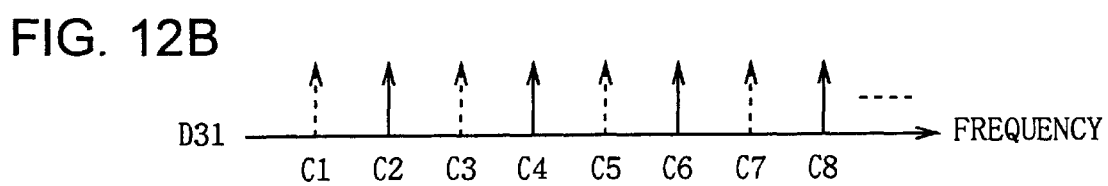

As shown in FIGS. 12A and 12B, this is because of the phase rotation of the signal component of each sub-carrier in the reception symbol stream D31 which is delayed for a half period T/2 of one modulation period, comparing to the reception symbol stream D30 being the original signal. More specifically, the phase rotation of each sub-carrier is generated in such a way that: the amount of phase rotation of the sub-carrier C1 is 0, the amount of phase rotation of the sub-carrier C2 is $\pi$, the amount of phase rotation of the sub-carrier C3 is $2\pi$, the amount of phase rotation of the sub-carrier C4 is $3\pi$, the amount of phase rotation of the sub-carrier C5 is $4\pi$, and so on. When adding the above phase-rotated reception symbol stream D31 to the reception symbol stream D30 being the original signal, phase inversion occurs on the original signal of the signal components of the even-numbered sub-carriers C2, C4, C6, . . . , of which the amount of phase rotation are $\pi$, $3\pi$, $5\pi$, . . . , so that the signal components of these sub-carriers C2, C4, C6, . . . , are negated. Thereby, the symbol stream D32 generated by the adding is composed of only the signal components of the odd-numbered sub-carriers C1, C3, C5, C7, C9, C11, C13, C15, 17, C19 and C21 on which the symbols of the high priority data are superimposed.

In a reference storage circuit 68, such reference symbol stream that the information bit stream considered as high priority data is coded similar to the transmitting side to be QPSK-modulated and is lined on the frequency axis, and the original information bit stream are stored. That is, the reference symbol stream, that the high priority data is processed similar to the transmitting side so as to be superimposed on the sub-carriers C1, C3, C5, C7, C9 C11, C13, C15, C17, C19, and C21, are stored for all information bit streams which can be considered as high priority data, and all the information bit streams which can be considered as high priority data are stored.

The correlation calculation circuit 67 successively reads out the reference symbol stream D33 from the reference storage circuit 68, and calculates the correlation value between the reference symbol stream D33 and the input symbol stream D32. The information bit stream D34 on the reference symbol stream D33 of the largest correlation value is read out from the reference storage circuit 68 to be output as the bit stream DH4 of the high priority data.

Thus, in the first demodulating unit 63, the reception symbol stream D30 is delayed for a half period T/2 of one modulation period T, the symbol stream D32 consisting of only high priority data is generated by adding the above delayed reception symbol stream to the reception symbol stream D30, and the correlation value between the symbol stream D32 and the reference symbol stream D33 is calculated, so that the bit stream DH4 of the high priority data is decoded. In this way, in the first demodulating unit 63, even when the signal components of high priority data and the signal components of low priority data are lined on the frequency axis, the high priority data can be decoded promptly by extracting only the signal components of high priority data from the reception symbol stream D30.

On the other hand, the second demodulating unit 64 is a demodulating unit for demodulating the low priority data, where the reception symbol stream D30 is firstly input to a buffer 69. The reception symbol stream D30 stored in the buffer 69 is successively read out and is input to the following fast Fourier transform circuit (FFT) 70. The fast Fourier transform circuit 70 performs fast Fourier transform processing on the reception symbol stream D30 to generate a signal in which the symbols lined on the frequency axis are lined on the time axis. More specifically, the fast Fourier transform circuit 70 takes out the symbols superimposed on respective sub-carriers, and generates the symbol stream D36 which is lined on the time axis. The symbol stream D36 generated by the processing of the fast Fourier transform circuit 70 is input to a DQPSK demodulation circuit 71 next.

The DQPSK demodulation circuit 71 inputs the symbol stream D36 to a delay circuit 71A and a multiplier 71B respectively. The multiplier 71B multiplies the reception symbol currently input and the conjugate value of the one previous reception symbol supplied through the delay circuit 71A, to perform the differential demodulation processing on the symbol stream D36. Note that the symbol stream D37 obtained by this processing is a symbol stream which is QPSK-modulated.

The selection switch 72 receives the symbol stream D37 at the input terminal, and turns on when the symbol stream D37 is even-numbered symbol, so that only the even-numbered symbols of the symbol stream D37 are extracted. In this case, since the even-numbered symbols of the symbol stream D37 are symbols corresponding to the low priority data, the symbol stream D38 obtained by the processing of the selection switch 72 is symbol stream composed of only symbols corresponding to the low priority data, and corresponds to the symbol stream D23 output from the QPSK modulation circuit 45 of the transmitter 40.

The error detection and correction circuit 73 receives the symbol stream D38 and takes out the bit stream from the symbol stream D38. The error detection and correction circuit 73 then detects the errors of the information bits based on the error detection and correction bits included in the bit stream and corrects the errors. The resultant information bits are output as bit stream DL4 of the low priority data.

In the second demodulation circuit 64, the fast Fourier transform processing is performed on the reception symbol stream D30 to obtain the symbol stream D36 in which symbols are lined on the time axis. After the differential demodulation processing is performed on the symbol stream D36, the symbol stream D38 corresponding to the low priority data is extracted to take out the information bits, so that the low priority data is decoded.

(1-5) Operations and Effects

In the above configuration, in the transmitter 40 of the communication system, the symbol stream D21 generated from the high priority data and the symbol stream D23 generated from the low priority data are alternately selected, so as to generate such symbol stream D26 that the high priority symbols and the low priority symbols are alternately lined as shown in FIG. 7. Then, the inverse Fourier transform processing is performed on the symbol stream D26 to assign a symbol to each of a plurality of sub-carriers C1 to C22. In this case, since the high priority symbols and the low priority symbols are alternately positioned in the symbol stream D26, the high priority symbols and the low priority symbols are also alternately positioned on the frequency axis. More specifically, the high priority symbols are superimposed on the odd-numbered sub-carriers C1, C3, C5, C7, C9, C11, C13, C15, C17, C19 and C21, and the low priority symbols are superimposed on the even-numbered sub-carriers C2, C4, C6, C8, C10, C12, C14, C16, C18, C20 and C22. The transmission symbol stream D27 generated thus is transmitted via the antenna 50 as the transmission signal S20 after a predetermined transmission processing is performed.

On the other hand, in the receiver 60, the transmission signal S20 transmitted from the transmitter 40 is received by the antenna 61. A predetermined reception processing is performed on the transmission signal S20 to obtain the reception symbol stream D30. In the receiver 60, the reception symbol stream D30 is firstly delayed for a half period T/2 of one modulation period T to generate the reception symbol stream D31. The reception symbol stream D31 and the reception symbol stream D30 being the original signal are added to generate the symbol stream D32 composed of only the signal components of the odd-numbered sub-carriers C1, C3, C5, C7, C9, C11, C13, C15, C17, C19, and C21 on which the high priority symbols are superimposed.

The symbol stream D32 and the reference symbol stream D33 are used to detect the correlation value. The information bit stream D34 which is the original of the reference symbol stream D33 having the largest correlation value is output as the bit stream DH4 of the high priority data.

Thus, in this communication system, the high priority symbols and the low priority symbols are alternately positioned in a frame, and successively assigned to each of a plurality of sub-carriers C1 to C22, so that the transmission signal S20 in which the sub-carriers having the high priority data superimposed and the sub-carriers having the low priority data superimposed are alternately positioned on the frequency axis is generated and output. At the receiving side, a predetermined reception processing is performed on the transmission signal S20 to obtain the reception symbol stream D30. The reception symbol stream D30 is delayed for a half period T/2 of one modulation period T to generate the reception symbol stream D31. The reception symbol stream D31 is added to the reception symbol stream D30 being the original signal to generate the symbol stream D32 composed of only the signal components of the high priority symbols. The demodulation processing is performed on the symbol stream D32 by detecting the correlation value to decode the bit stream DH4 of the high priority data. Therefore, in case of the communication system, even if the high priority data and the low priority data are transmitted at the same time by the multi-carrier method for one modulation period, only the signal components of the high priority data can be extracted and the high priority data can be decoded promptly with a simple configuration using no high efficiently filter circuit.

On the other hand, as the low priority data, the fast Fourier transform processing is performed on the reception symbol stream D30 to generate the symbol stream D36 in which symbols are lined on the time axis, and the even-numbered symbols are extracted from the symbol stream D36 to generate the symbol stream D38 composed of only symbols of the low priority data. The bit stream is taken out from the symbol stream D38 and the bit stream DL4 of the low priority data is decoded by performing the error detection and error correction processing on the bit stream.

Thus, as the low priority data, after the fast Fourier transform processing is performed so as to execute the signal conversion processing from the frequency axis to the time axis, the symbol stream D38 composed of only symbols of the low priority data is generated by the temporal division processing, and the demodulation and error correction processing are performed on the symbol stream D38 to decode the low priority data DL4. Thereby, the low priority data DL4 can be surely decoded.

According to the above configuration, at the transmitting side, the high priority symbols and the low priority symbols are transmitted at the same time by transmitting the transmission signal S20 in which the sub-carriers having the high priority data superimposed and the sub-carriers having the low priority data superimposed are alternately positioned on the frequency axis. At the receiving side, the reception symbol stream D30 obtained through a predetermined reception processing is delayed for a predetermined period to be added to the reception symbol stream D30, so that the symbol stream D32 composed of only the signal components of the high priority data is generated. The demodulation processing is performed on the symbol stream D32 by detecting the correlation value to decode the high priority data. Therefore, even if the high priority data and the low priority data are transmitted at the same time using a plurality of sub-carriers C1 to C22 for one modulation period, the high priority data can be decoded promptly with a simple configuration. Thus, even when the high priority data and the low priority data are transmitted at the same time by the multi-carrier method, processing in accordance with the priority can be performed with a simple configuration.

(2) Aspects of the Second Embodiment (2-1) Background Art

An example in the case where this invention is applied to a cellular radio communication system will be explained in the aspects of the second embodiment. Note that a portable telephone system will be explained here as a cellular radio communication system.

First of all, a portable telephone system which is the background arts of the second embodiment is explained. Generally, in the portable telephone system, an area for providing communication service is divided into cells having a desired size, and a base station is provided in each cell as a fixed radio station. A portable telephone device as a mobile radio station radio-communicates with the base station within the cell where the portable telephone device exists. In this way, so-called cellular radio communication system is constructed.

In such a portable telephone system, when a calling is made by the portable telephone device for example, the call processing is performed by the following procedure. The portable telephone device firstly transmits a control data composed of a preamble data and a message data to a base station using a control channel called a random access channel (RACH). The base station monitors the random access channel and detects whether or not there is a message from the portable telephone device by detecting the existence of the preamble data. When the preamble data is detected, the base station judges that there is a message from the portable telephone device, detects the following message data, and analyzes the contents of the message data. If the content of the message data is a call request, the base station determines a demesne control channel (DCCH) to be used for communication with the portable telephone device, and informs this channel number to the portable telephone device using an answer governing channel (AGCH). A predetermined control processing is executed between the portable telephone device and the base station via the informed occupational control channel, so that the call processing from the portable telephone device is realized.

In the call processing, the control data firstly transmitted from the portable telephone device is composed of the preamble data and the message data as described above. In this case, the preamble data represents the existence of message data, and the base station side detects the preamble data to detect whether the message data exists or not. Accordingly, in case where the base station side prioritizes the data based on the detection order, the preamble data has the highest priority and the message data representing the concrete request content has the lower priority than the preamble data.

To detect the preamble data corresponding to the high priority data, the electric power of the random access channel is generally measured. However, the preamble data may not be detected by the electric power measurement depending on the communication method. For example, in a portable telephone system using the CDMA method by the code division or the TDMA method in which so-called frequency hopping is performed for changing the frequency channel for each slot, the preamble data can not be detected by the simple power measurement since other signals are intermingled on the band or the bands is changed one after another. Therefore, this type of portable telephone system decodes the preamble data by detecting the preamble data.

At this time, if the preamble data can be detected promptly by decoding, there is no problem because the following message data can be decoded. However, if the preamble data can not be detected promptly, the message data may not be decoded. For instance, in the case of the multi-carrier method where a plurality of sub-carriers are used to transmit preamble data and message data at the same time for one modulation period, the message data may not be decoded if the preamble data is not detected by promptly extracting the signal components of the preamble data. Hence, in this invention, even if the multi-carrier communication is performed on the condition that the preamble data representing the existence of message can not be detected by the power measurement, the preamble data can be detected promptly. Hereinafter, this point will be explained step by step.

(2-2) The Frame Structure

Figure 13:
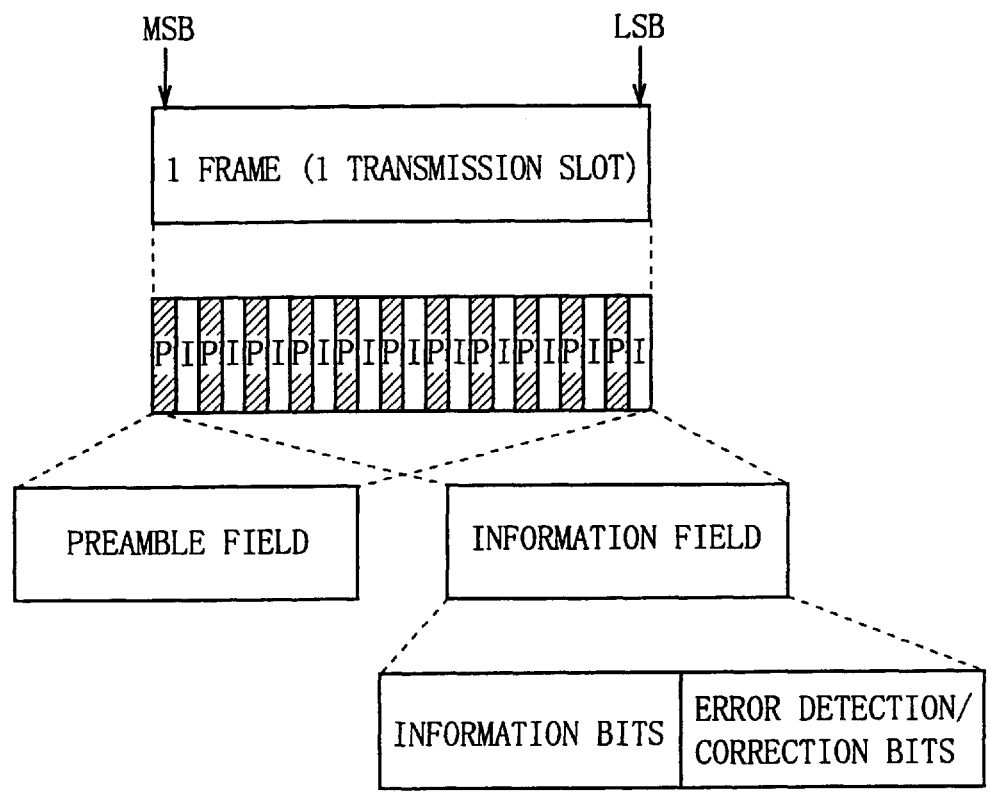
FIG. 13 is a schematic diagram illustrating the frame structure of a portable telephone system according to the second embodiment.

FIG. 13 shows the frame structure of the control data consisting of preamble data and message data. As shown in FIG. 13, in the portable telephone system according to this invention, the control data composed of the preamble data and the message data is transmitted by one frame. At this time, the transmission symbols of the preamble data and the transmission symbols of the message data are alternately positioned in the frame. In other words, when the transmission symbols positioned by turns are collected alternately, they become a preamble field which is the preamble data, and when the other remained transmission symbols are collected, they become an information field which is the message data.

In this case, in the information field, the transmission symbols generated from the message data which represent the control contents for the base station and the transmission symbols generated from the error detection and correction bits which are added to the message data are stored. In the meantime, in the preamble field, the transmission symbols generated from the preamble data representing the existence of message data are stored.

In connection, the preamble data is an inherent data set for each base station, and the portable telephone device being a mobile station uses the inherent data of the base station which is desired to communicate with as the preamble data. In addition, a plurality of inherent data are prepared for one base station in accordance with the attribute (such as type) of the message data. The portable telephone device employs the inherent data suitable for the attribute of message data to be transmitted to the base station as the preamble data. Thereby, the base station being the receiving side can detect the preamble data to detect the existence of the message data, and also can recognize the attribute of the message data.

Thus, in the portable telephone system according to this invention, when starting a call from the portable telephone device, the control data thus structured is transmitted to the base station via the random access channel.

(2-3) The Configuration of Random Access Channel

Figure 14:
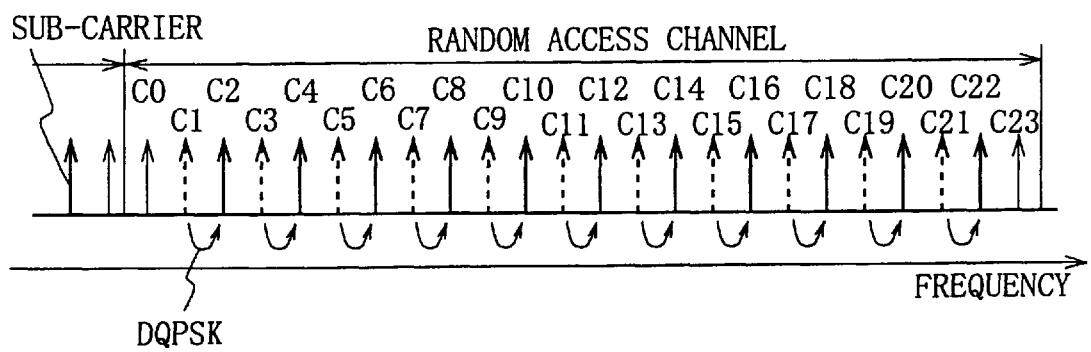
FIG. 14 is a schematic diagram showing the configuration of a random access channel of the portable telephone system.

Here, FIG. 14 shows the configuration of the random access channel of the portable telephone system. This portable telephone system also performs the multi-carrier communication similarly to the first embodiment, and has a plurality of sub-carriers as the random access channel. More specifically, as shown in FIG. 14, the random access channel consists of, for example, twenty-four sub-carriers C0 to C23 positioned at the same intervals on the frequency axis. Twenty-two sub-carriers C1 to C22 excepting sub-carriers C0 and C23 at both sides of the twenty-four sub-carriers C0 to C23, which are guard carriers, are used to transmit the transmission symbols of the control data described above.

In the portable telephone system, each of the transmission symbols of the control data is assigned one by one to each plurality of sub-carriers C1 to C22 shown in FIG. 14 successively. Thus, the odd-numbered sub-carriers C1, C3, C5, C7, C9, C11, C13, C15, C17, C19 and C21 are used for the transmission symbols of the preamble data, and the even-numbered sub-carriers C2, C4, C6, C8, C10, C12, C14, C16, C18, C20 and C22 are used for the transmission symbols of the message data.

In connection, the transmission symbols of the preamble data are assigned to each of the sub-carriers C1, C3, C5, C7, C9, C11, C13, C15, C17, C19 and C21 as they are. On the other hand, in the case of the transmission symbols of the message data, the differential phases between the transmission symbols of the message data and the transmission symbols of the one previous preamble data are assigned to the sub-carriers C2, C4, C6, C8, C10, C12, C14, C16, C18, C20 and C22. That is, the transmission symbols of the message data are DQPSK-modulated respectively and are assigned to the sub-carriers C2, C4, C6, C8, C10, C12, C14, C16, C18, C20 and C22.

(2-4) The Configuration of Transmitter

Figure 15:
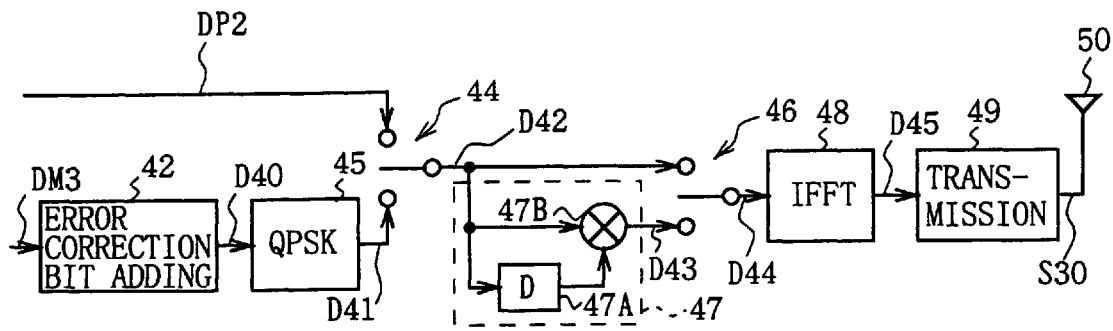
FIG. 15 is a block diagram showing the configuration of a transmitter for transmitting control data via the random access channel.

Here, a transmitter for transmitting control data via the random access channel will be explained. In FIG. 15 where the portions corresponding to those of FIG. 9 are designated with the same reference numerals, 80 shows a transmitter for transmitting control data via random access channels as a whole. This transmitter 80 is provided on a portable telephone device, and sends control data to be transmitted via the base station via the random access channels. In the transmitter 80, the preamble data DP2 composing a control data is input to the input terminal of the first selection switch 44. Note that the preamble data DP2 are the symbolized data suitable for the attribute of message data DM3 described later and are the inherent data of the base station with which the portable telephone device communicates.

The message data DM3 composing a control data is input to the error correction bit adding circuit 42. The error correction bit adding circuit 42 calculates the error detection and correction bits based on the information bits of the input massage data DM3, and adds the error detection and correction bits to the message data DM3 to generate a bit stream D40 on which a processing for error correction is performed, which are output to the QPSK modulation circuit 45 at the subsequent stage. The QPSK modulation circuit 45 successively performs the QPSK modulation processing on the input bit stream D40 to generate a symbol stream D41, which is output to the second input terminal of the first selection switch 44 at the subsequent stage.

The first selection switch 44 changes the connection of the input terminal alternately to select the symbols of the preamble data DP2 supplied to the first input terminal and the symbols of the symbol stream D41 relating to the message data DM3 supplied to the second input terminal alternately, so as to generate a symbol stream D42, in which the symbols of the preamble data DP2 and the symbols of the message data DM3 are lined alternately, as shown in FIG. 13. The symbol stream D42 is output to the first input terminal of the second selection switch 46, and is output to a delay circuit 47A and multiplier 47B which consist of a differential modulation circuit 47.

The differential modulation circuit 47 differential-modulates a currently input symbol by multiplying the currently input symbol and the one previous symbol, which is obtained through the delay circuit 47A, via the multiplier 47B. This processing is successively repeated to generate the differential symbol stream D43, which is output to the second input terminal of the second selection switch 46.

When the symbol stream D42 is odd-numbered, the second selection switch 46 selects the odd-numbered symbols of the symbol stream D42 by connecting to the first input terminal. When the differential symbol stream D43 is even-numbered, the second selection switch 46 selects the even-numbered symbols of the differential symbol stream D43 by connecting to the second input terminal. The resultant symbol stream D44 is output to an inverse fast Fourier transform (IFFT) circuit 48 at the subsequent stage. In this case, the odd-numbered symbols of the symbol stream D42 and the differential symbol stream D43 are the symbols of the preamble data DP2, and the even-numbered symbols are the symbols of the message data DM3. Thus, if the symbol stream D42 and the differential symbol stream D43 are selected alternately by the second selection switch 46, the symbol stream D44 where the symbols of the preamble data DP2 and the symbols of the differential-modulated message data DM3 are alternately lined can be obtained. Note that since the differential modulation is performed with the one previous symbol, the symbols of the message data DM3 are differential-modulated based on the symbols of the preamble data DP2.

The inverse fast Fourier transform circuit 48 performs the inverse fast Fourier transform processing on the symbol stream D44 to generate such signal where symbols lined on the time axis is lined on the frequency axis. That is, the inverse fast Fourier transform circuit 48 allocates each symbol of the symbol stream D44 to each of the sub-carriers C1 to C22 successively. The transmission symbol stream D45 generated by the processing of the inverse fast Fourier transform circuit 48 is input to the following transmission circuit 49.

The transmission circuit 49 performs the window processing and the filtering processing on the transmission symbol stream D45, and further performs the digital-to-analog conversion processing to generate a transmission signal. The transmission circuit 49 then performs the frequency conversion processing on the transmission signal to generate a transmission signal S30 on the random access channel, which is transmitted via an antenna 50. In this way, the transmission signal S30 having the preamble data DP2 and message data DM3 superimposed alternately on the sub-carriers C1 to C22 is transmitted via the transmitter 80.

(2-5) The Configuration of Receiver

Figure 16:
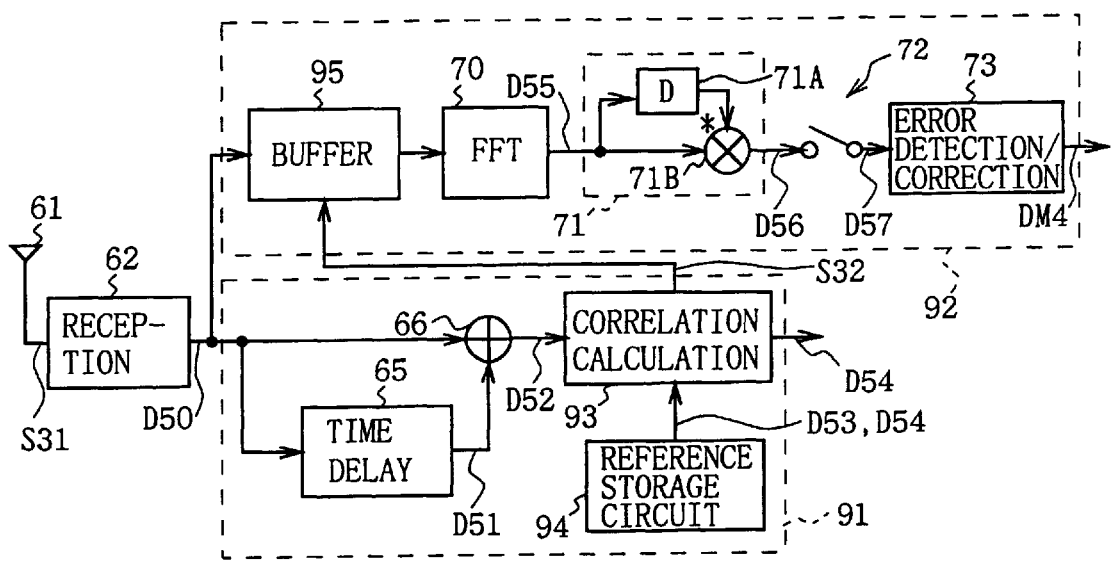
FIG. 16 is a block diagram showing the configuration of a receiver for receiving control data transmitted via the random access channel.

A receiver for receiving the transmission signal S30 transmitted via the random access channel described above will be explained in this paragraph. In FIG. 16 where the portions corresponding to those of FIG. 10 are designated with the same reference numerals, 90 shows a receiver for receiving the transmission signal S30 transmitted via the random access channel as a whole. The receiver 90, which is provided in the base station, receives the transmission signal S30 being control data transmitted from the portable telephone device as described above.

In the receiver 90, the transmission signal S30 transmitted from the transmitter 80 is received at the antenna 61, and is input to a reception circuit 62 as a reception signal S31. The reception circuit 62 performs the filtering processing and then the frequency conversion processing on the reception signal S31 to take out a baseband signal. The reception circuit 62 performs the analog-to-digital conversion processing on the baseband signal to obtain a reception symbol stream, and performs the window processing on the reception symbol stream for one modulation period, and normalizes each symbol with the total value of the signal power for one modulation period (or the total value of the amplitude). The resultant reception symbol stream D50 is output to first and second demodulating units 91, 92. In connection, the reception symbol stream D50 is the symbol stream before the Fourier transform processing is performed, and that is symbol stream in which each symbol is lined on the frequency axis.

The first demodulating unit 91 is a demodulating unit for detecting the preamble data, and inputs the reception symbol stream D50 to an internal time delay circuit 65 and an adder 66 respectively. The time delay circuit 65 delays the reception symbol stream D50 of one modulation period received by the reception circuit 62 for a half of one modulation period T, that is T/2, and outputs the resultant reception symbol stream D51 to the adder 66.

The adder 66 adds the reception symbol stream D50 and the reception symbol stream D51 for the period T/2 after the supplying of the reception symbol stream D51 starts. Thereby, the adder 66 generates a symbol stream D52 where the latter half of the reception symbol stream D50 and the former half of the reception symbol stream D51 are added, and the symbol stream D51 is output to a correlation calculation circuit 93.

In connection, by performing the above adding processing, similarly to the first embodiment, the symbol stream D52 consisting of only the signal components of the odd-numbered sub-carriers C1, C3, C5, C7, C9, C11, C13, C15, C17, C19 and C21, on which the preamble data is superimposed, can be obtained.

In a reference storage circuit 94, a plurality of reference symbol streams wherein the symbols of the preamble data which are inherent for respective base station are lined on the frequency axis and a plurality of attribute information of the preamble data are stored.

A correlation calculation circuit 93 successively reads out the reference symbol stream D53 from the reference storage circuit 94 and calculates the correlation value between the reference symbol stream D53 and the input symbol stream D52. If the correlation value exceeds a predetermined threshold value, the correlation calculation circuit 93 judges that the preamble data is received (that is, judges that the message data exists) and outputs a control signal S32, which represents the start of demodulating the message data, to the second demodulating unit 92. Also, the correlation calculation circuit 93 successively reads out the attribute information of the preamble data from the reference storage circuit 94 based on the reference symbol stream D53 of the correlation value exceeding the threshold value. The attribute information is output to a controlling circuit (not shown) for controlling the entire operation of the base station. Thereby, the controlling circuit can confirm the attribute of the message data before the message data is demodulated, and can prepare for the message data. In connection, if a plurality of correlation values exceeding the threshold value exist in the correlation detection, the correlation calculation circuit 93 reads out the attribute information of the message data based on the reference symbol stream of the largest correlation value.

Thus, in the first demodulating unit 91, the reception symbol stream D50 is delayed for a half period T/2 of one modulation period T and the delayed reception symbol stream is added to the reception symbol stream D50, so as to generate the symbol stream D52 composed of only the signal component of the preamble data. The correlation value between the symbol stream D52 and the reference symbol stream D53 is calculated, so that it is detected whether the preamble data is received or not. Thereby, in the first demodulating unit 91, even when the signal components of the preamble data and the signal components of the message data are lined on the frequency axis, only the signal components of the preamble data can be extracted from the reception symbol stream D50 to detect the preamble data promptly.

In addition, the control data is transmitted in accordance with timing assigned to its own station. However, if transfer delay occurs due to the large size of cell and the control data arrive asynchronously, the first demodulating unit 91 repeats this processing for each short period to detect the preamble data. Further, if the control data arrive periodically due to the small size of cell, the first demodulating unit 91 performs this processing in accordance with the arrival timing so as to detect the preamble data.

On the other hand, the second demodulating unit 92 is a demodulating unit for demodulating the message data. The reception symbol stream D50 is firstly input to a buffer 95. When receiving the control signal S32 from the correlation calculation circuit 93 of the first demodulating unit 91 (that is, when confirming the existence and attribute of the preamble data by the first demodulating unit 91), the buffer 95 successively reads out and outputs the stored reception symbol stream D50 to the fast Fourier transform circuit (FFT) 70, where the demodulating of the message data is started. In connection, when the buffer 95 does not receive the control signal S32 from the correlation calculation circuit 93, it judges that the preamble data is not detected, and does not output the reception symbol stream D50 and does not start demodulating the message data.

The fast Fourier transform circuit 70 receives the reception symbol stream D50 output from the buffer 95 and performs the fast Fourier transform processing on the reception symbol stream D30 to generate a signal where the symbols lined on the frequency axis is lined on the time axis. More specifically, the fast Fourier transform circuit 70 takes out the symbols superimposed on respective sub-carriers, and generates the symbol stream D55 in which the symbols are lined on the time axis. The symbol stream D55 generated by the processing of the fast Fourier transform circuit 70 is input to the following DQPSK demodulation circuit 71.

The DQPSK demodulation circuit 71 inputs the symbol stream D55 to the delay circuit 71A and the multiplier 71B respectively. The multiplier 71B multiplies the currently input reception symbol and the conjugate value of the one previous reception symbol supplied through the delay circuit 71A, so as to perform the differential demodulation processing on the symbol stream D55. Note that the symbol stream D56 obtained by this processing is a QPSK-modulated symbol stream.

The selection switch 72 receives the symbol stream D56 with its input terminal, and is turned on when the symbol stream D56 is even-numbered symbol, so as to extract only the even-numbered symbols of the symbol stream D56. In this case, since the even-numbered symbols of the symbol stream D56 are symbols corresponding to the message data, the symbol stream D57 obtained by the processing of the selection switch 72 is a symbol stream consisting of only symbols corresponding to the message data, and corresponds to the symbol stream D41 output from the QPSK modulation circuit 45 of the transmitter 80.

The error detection and correction circuit 73 receives the symbol stream D57 and takes out the bit stream of the message data from the symbol stream D57. The error detection and correction circuit 73 then detects the errors of the information bits consisting of the message data based on the error detection and correction bits included in the bit stream, and corrects the errors. The resultant information bits are output to a controlling circuit (not shown) for controlling the entire operation of the base station as a bit stream DM4. Thereby, the controlling circuit can confirm the reception of the message data and control the communication sequence in accordance with the message data.

Thus, in the second demodulation circuit 92, when the preamble data is detected, the fast Fourier transform processing is performed on the reception symbol stream D50 to obtain the symbol stream D55 in which symbols are lined on the time axis. After the differential demodulation processing is performed on the symbol stream D55, the symbol stream D57 corresponding to the message data is extracted to take out the information bits, so that the message data is decoded.

(2-6) Operations and Effects

In the above configuration, in the transmitter 80 of the portable telephone system, the symbols of the preamble data DP2 and the symbols generated from the message data DM3 are alternately selected, so as to generate such symbol stream D44 where the symbols of the preamble data and the symbols of the message data are alternately lined as shown in FIG. 13. Then, the inverse Fourier transform processing is performed on the symbol stream D44 to assign a symbol to each of a plurality of sub-carriers C1 to C22. In this case, since the symbols of the preamble data DP2 and the symbols of the message data DM3 are alternately positioned in the symbol stream D44, the symbols of the preamble data DP2 and the symbols of the message data DM3 are also alternately positioned on the frequency axis. The transmission symbol stream D45 obtained thus is transmitted via the antenna 50 as the transmission signal S30 after performed a predetermined transmission processing.

On the other hand, in the receiver 90, the transmission signal S30 transmitted from the transmitter 80 is received by the antenna 61. A predetermined reception processing is performed on the transmission signal S30 to obtain the reception symbol stream D50. In the receiver 90, the reception symbol stream D50 is firstly delayed for a half period T/2 of one modulation period T to generate the reception symbol stream D51. The reception symbol stream D51 and the reception symbol stream D50 being the original signal are added to generate the symbol stream D52 consisting of only the signal components of the odd-numbered sub-carriers C1, C3, C5, C7, C9, C11, C13, C15, C17, C19 and C21 on which the symbols of the preamble data DP2 are superimposed.

The symbol stream D52 and the reference symbol stream D53 are used to detect the correlation value. When the correlation value exceeds a predetermined threshold value, it is judged that the preamble data DP2 are received, and the control signal S32 is output to the second demodulating unit 92 so as to instruct the second demodulating unit 92 to start the demodulation processing of the message data DM3. Thereby, in the receiver 90, only when the preamble data DP2 are detected, the message data DM3 are demodulated. Therefore, the processing in the receiver can be reduced comparing to the case where the detection of the preamble data DP2 and the demodulation of the message data DM3 are simply performed in parallel.

Further, the attribute of the message data DM3 is determined based on the reference symbol stream D53 of the correlation value exceeding the threshold value, and the attribute information D54 is output to the controlling circuit for controlling the entire operation of the base station. Thereby, the controlling circuit can confirm the attribute of the message data DM3 before demodulating the message data DM3. In connection, the attribute of the message data DM3 can be obtained from the preamble data DP2, so that the portable telephone system can easily change the importance of the message data, the format of the message data, the modulation method, and/or the coding method, and can transmit and receive message data flexibly.

In this way, in the portable telephone system, the symbols of the preamble data DP2 and the symbols of the message data DM3 are alternately positioned and successively assigned to each of a plurality of sub-carriers C1 to C22, so that the transmission signal S30 in which the sub-carriers having the preamble data DP2 superimposed and the sub-carriers having the message data DM3 superimposed are alternately positioned on the frequency axis is generated to be transmitted. At the receiving side, a predetermined reception processing is performed on the transmission signal S30 (i.e., reception signal S31) to obtain the reception symbol stream D50 in which each symbol is lined on the frequency axis. The reception symbol stream D50 is delayed for a half period T/2 of one modulation period T to generate the reception symbol stream D51. The reception symbol stream D51 is added to the reception symbol stream D50 being the original signal to generate the symbol stream D52 consisting of only the signal components of the preamble data DP2. The correlation value detection processing is performed on the symbol stream D52 to detect the preamble data DP2. Therefore, in case of the portable telephone system, even if the control data consisting of the preamble data DP2 and the message data DM3 are transmitted at the same time by the multi-carrier communication for one modulation period, only the signal components of the preamble data DP2 can be extracted, and the preamble data DP2 can be detected promptly with a simple configuration using no high efficiency filter circuit.

On the other hand, as the message data DM3, the fast Fourier transform processing is performed on the reception symbol stream D50 to generate the symbol stream D55 in which symbols are lined on the time axis, and the even-numbered symbols are extracted from the symbol stream D55 to generate the symbol stream D57 composed of only the symbols of the message data DM3. The bit stream is taken out from the symbol stream D57 and the bit stream DM4 of the message data DM3 is decoded by performing the error detection and error correction processing on the bit stream.

Thus, in the case of the message data DM3, after the fast Fourier transform processing is performed so as to execute the signal conversion processing from the frequency axis to the time axis, the symbol stream D57 composed of only symbols of the message data DM3 is generated by the temporal division processing, and the demodulation and error correction processing is performed on the symbol stream D57 to decode the bit stream DM4 of the message data DM3. Thereby, the message data DM3 can be decoded certainly.

According to the above configuration, at the transmitting side, the transmission signal S30 in which the sub-carriers having the preamble data DP2 superimposed and the sub-carriers having the message data DM3 superimposed are alternately positioned on the frequency axis is transmitted so as to transmit the preamble data and the message data at the same time during one modulation period. At the receiving side, the reception symbol stream D50 obtained through a predetermined reception processing is delayed for a predetermined period to be added to the reception symbol stream D50 so as to generate the symbol stream D52 consisting of only the signal components of the preamble data DP2. The preamble data DP2 are detected by detecting the correlation value. Thereby, even if the preamble data DP2 and the message data DM3 are transmitted at the same time using a plurality of sub-carriers C1 to C22 for one modulation period, the preamble data DP2 can be detected promptly with a simple configuration. Thus, even when the preamble data DP2 and the message data DM3 are transmitted at the same time by the multi-carrier method, the processing in accordance with the priority can be performed with a simple configuration.

(3) Aspects of the Other Embodiments

The first embodiment described above has been dealt with the case where the number of the sub-carriers having the high priority data superimposed is the same as the number of the sub-carriers having the low priority data superimposed, and the sizes of respective data transmitted in one transmission are the same as each other. However, this invention is not limited to this, but the number of times the high priority data appear can be decreased to $\frac{1}{2}^N$ so as to reduce the number of sub-carriers of the high priority data comparing to that of the low priority data, so that the larger number of the low priority data are transmitted in one transmission.

Figure 17:
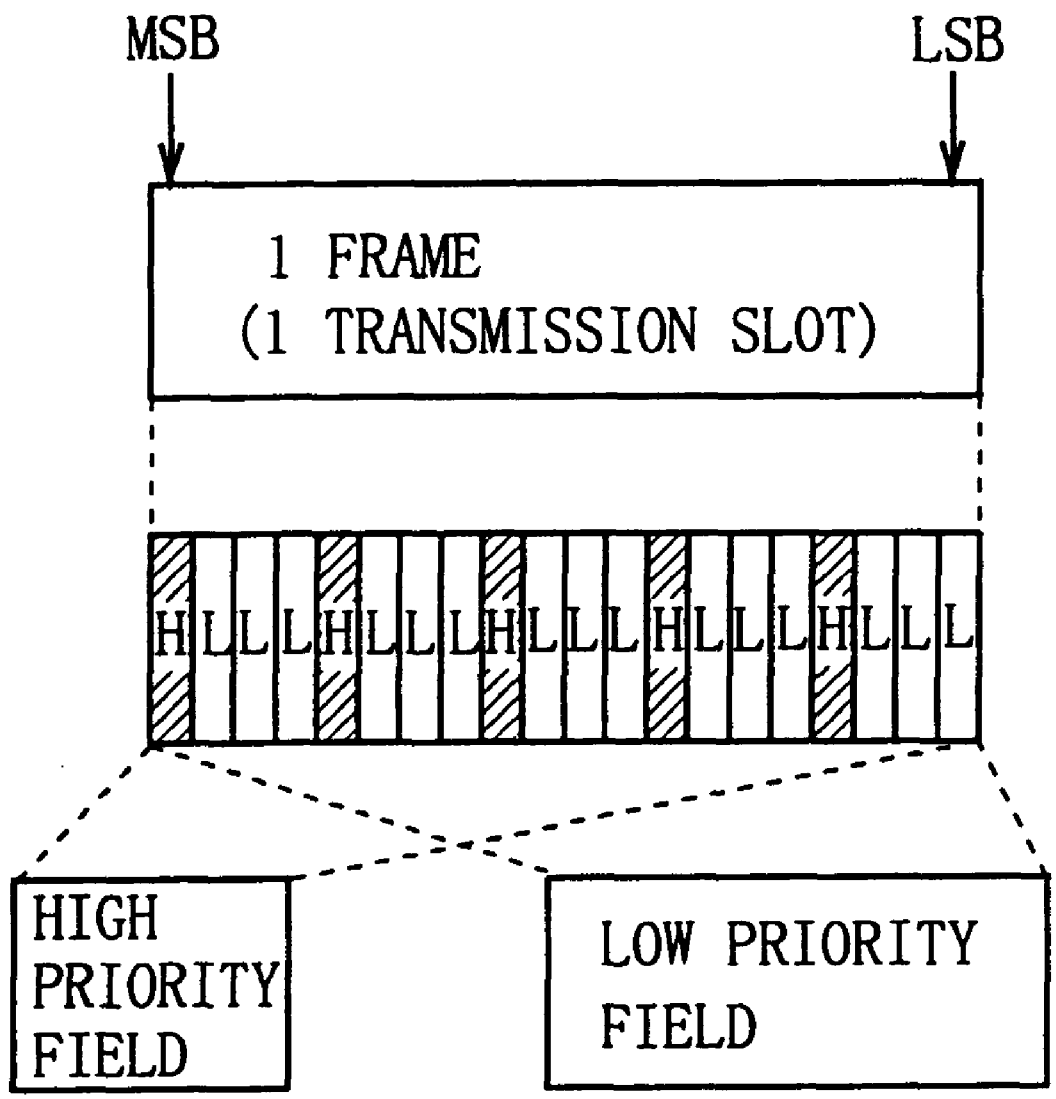
FIG. 17 is a schematic diagram showing the frame structure according to the other embodiment.

For example, as shown in FIG. 17, the number of times the high priority data appear is set to be ¼, so that the high priority data appear once in four times. Accordingly, in this case, the number of sub-carriers on which the high priority data is superimposed is ¼ of the whole sub-carriers, and the number of sub-carriers on which the low priority data is superimposed is ¾ of the whole sub-carriers. The ratio of the number of sub-carriers is 1:3.

Figure 18:
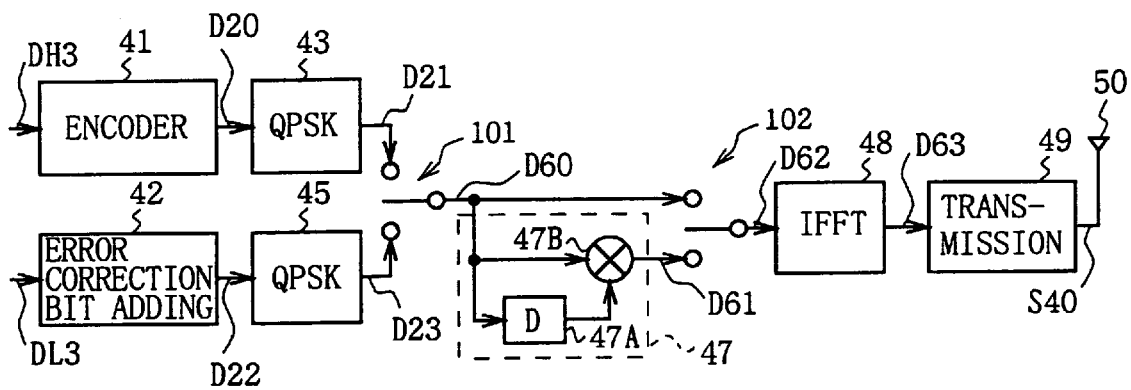
FIG. 18 is a block diagram showing the configuration of a transmitter according to other embodiment.

Here, the transmitter and the receiver in the case of setting the sub-carriers as described above will be explained referring to FIGS. 18 and 19. Note that the ratio of the number of sub-carriers of the high priority data and the low priority data is 1:3, and data communication is executed using the sub-carriers C1 to C20 in the following explanation. In FIG. 18 where the portions corresponding to those of FIG. 9 are designated with the same reference numerals, 100 shows an entire transmitter in which the ratio of the number of sub-carriers is changed, and is constructed generally similarly to the transmitter 40 shown in FIG. 9 excepting the first and second selection switches 101, 102. The transmitter 100 significantly differs from the transmitter 40 in the timing of the selection operation of the first and the second selection switches 101 and 102. More specifically, in this example, since the number of times the high priority data appear is ¼, the first selection switch 101 selects the transmission symbol D21 corresponding to the high priority data once in four times, and selects the transmission symbol D23 corresponding to the low priority data at other timing. Similarly, the second selection switch 102 selects the symbol stream D60 once in four times, and selects the differential symbol stream D61 at other timing. Thus, in the transmitter 100, the symbol stream D62 having the frame structure shown in FIG. 17 is generated, and a predetermined transmission processing is performed on this to be output as transmission signal S40.

Figure 19:
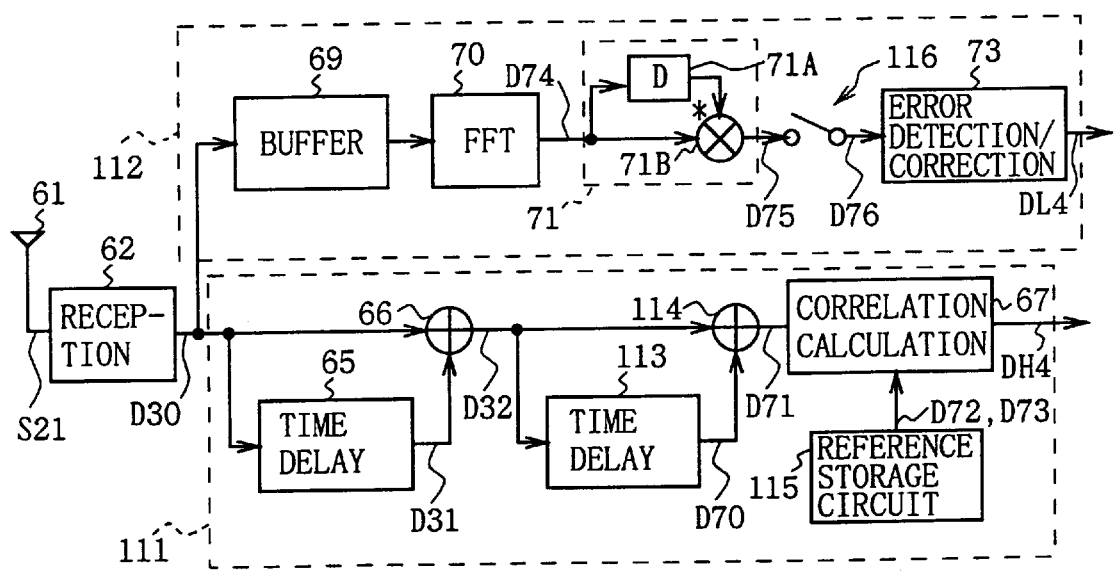
FIG. 19 is a block diagram showing the configuration of a receiver according to other embodiment.

On the other hand, in FIG. 19 where the portions corresponding to those of FIG. 10 are designated with the same reference numerals, 110 shows an entire receiver for receiving the transmission signal S40 transmitted after changing the ratio of the number of sub-carriers, and is constructed generally similarly to the receiver 60 shown in FIG. 10 excepting the configuration of the first demodulating unit 111 and the timing of the selection operation by the selection switch 116 in the second demodulating unit 112. In this case, in the first demodulating unit 111, a second time delay circuit 113 and a second adder 114 are added to the first time delay circuit 65 and the first adder 66. Thus, the adding processing of the delayed symbol stream comprises two steps.

More specifically, in the first demodulating unit 111, the delayed reception symbol stream D31 and the reception symbol stream D30 being the original signal are added to generate the symbol stream D32 consisting of only the signal components of the odd-numbered sub-carriers C1, C3, C5, C7, C9, C11, C13, C15, C17 and C19. The symbol stream D32 is input to the second time delay circuit 113 and the second adder 114. The second time delay circuit 113 delays the symbol stream D32 for a period T/4, which is ¼ of one modulation period T, and the resultant symbol stream D70 is output to the adder 114. The adder 114 adds the symbol stream D70 and the symbol stream D32 being the original signal for the period T/4 after the supplying of the delayed symbol stream D70 is started, so as to generate a symbol stream D71 consisting of only the signal components of the sub-carriers C1, C5, C9, C13 and C17, which is output to the correlation calculation circuit 67.

In the correlation calculation circuit 67, a reference symbol stream D72 stored in the reference storage circuit 115 is read out successively to calculate the correlation value to the symbol stream D71. Based on the reference symbol stream D72 having the largest correlation value, the information bit stream D73 is read out to be output, so that the high priority data DH4 can be decoded easily.

In the second demodulating unit 112, the first, fifth, ninth, thirteenth and seventeenth symbols of the symbol stream D75 output from the differential demodulation circuit 71 are the high priority data, and other symbols are the low priority data. If the second to fourth, sixth to eighth, tenth to twelfth, and fourteenth to sixteenth symbols are selected by the section switch 116, the symbol stream D76 consisting of only symbols of the low priority data can be obtained. Then, the error detection and correction circuit 73 extracts the information bits from the symbol stream D76 to correct errors, so that the low priority data DL4 can be decoded easily.

In addition, in the case where the number of times the high priority data appear is set to be $\frac{1}{2}^N$, the time delay circuits and adders should be provided for the number of the degree N, and the addition to the delayed symbol stream should be performed at N-stages.

Further, the second embodiment described above has been dealt with the case where control data composed of preamble data and message data are transmitted through the random access channel of the portable telephone system. However, this invention is not limited to this, but is applicable to the case where an information data composed of preamble data and message data is transmitted through the initial supplementation channel of the portable telephone system. The initial supplementation channel is a control channel for transmitting the information necessary to receive the control channel (BCCH) in which the system information of the portable telephone system is transmitted. For example, when turning on the power switch of the portable telephone device, the initial supplementation channel transmitted from the base station is received to obtain the information data relating to the control channel (BCCH). Based on the information data, the control channel (BCCH) is received and thereafter the processing for position registering is performed. In short, a channel for obtaining information promptly can detect the preamble data promptly by applying this invention, so that the same effect as the case described above can be obtained.

Further, the first embodiment described above has been dealt with the case where the error detection and correction bits are not added to the high priority data. However, this invention is not limited to this, but may be applied to a case where the high priority data for several frames are gathered and the error detection and correction bits are added to them.

Further, the first embodiment described above has been dealt with the case where the error detection and correction bits are added to the low priority data. However, this invention is not limited to this, but the error detection and correction bits can not be added to the low priority data if errors do not occur.

Further, the embodiment described above has been dealt with the case where the QPSK modulation is used as a modulating method. However, this invention is not limited to this, but other modulating methods for putting information components on the phases or the amplitude, such as the binary phase shift keying (BPSK) or the 16-quadrature amplitude modulation (16QAM) can be also employed.

Further, the embodiment described above has been dealt with the case where the differential modulation is performed on the low priority data and the message data. However, this invention is not limited to this, but it is possible not to perform the differential modulation, similarly to the case of the high priority data or the preamble data.

Further, the embodiment described above has been dealt with the case where the number of sub-carriers used for the multi-carrier communication is 24. However, this invention is not limited to this, but other number of the sub-carriers can be used.

Further, the embodiment described above has been dealt with the case where the encoder 41, the error correction bit adding circuit 42, the QPSK modulation circuits 43, 45, the inverse fast Fourier transform circuit 48, and the transmission circuit 49 are provided so that the sub-carriers having the high priority data DH3 superimposed and the sub-carriers having the low priority data DL3 superimposed are positioned alternately to be transmitted. However, this invention is not limited to this, but in a transmitter for transmitting the high priority data and low priority data at the same time using a plurality of sub-carriers, the transmitting means for transmitting the transmission signal, in which the sub-carriers having the high priority data superimposed and the sub-carriers having the low priority data superimposed are positioned alternately, is provided so that the same effect as the case described above can be obtained.

Further, the embodiment described above has been dealt with the case where the reception circuit 62 and the first and second demodulating units 63 and 64 are provided to receive the transmission signal S21 transmitted from the transmitter 40 and decode the high priority data DH4 and the low priority data DL4. However, this invention is not limited to this. In a receiver for receiving the transmission signal transmitted from the transmitter which transmits the high priority data and low priority data at the same time using a plurality of sub-carriers, there provides: receiving means for obtaining the reception symbol stream in which the symbols are lined on the frequency axis by performing a reception processing on the transmission signal in which the sub-carriers having the high priority data superimposed and the sub-carriers having the low priority data superimposed are positioned alternately; first demodulating means for decoding the high priority data by adding the delayed symbol stream being the reception symbol stream delayed for a predetermined time to the reception symbol stream and extracting the signal components relating to the high priority data; and second demodulating means for obtaining the symbol stream in which the symbols are lined on the time axis by performing the Fourier transform processing on the reception symbol stream, and for decoding the low priority data by extracting the symbols of the low priority data from the symbol stream. Thereby, the same effect as the case described above can be obtained according to this invention.

In other words, the transmission signal in which the sub-carriers having the high priority data superimposed and the sub-carriers having the low priority data superimposed are positioned alternately is transmitted. At the receiving side, a predetermined reception processing is performed on the transmission signal to obtain the reception symbol stream in which symbols are lined on the frequency axis. The delayed symbol stream which is the reception symbol stream delayed for a predetermined time is added to the reception symbol stream to extract the signal components relating to the high priority data, so that the high priority data is decoded. At the same time, the Fourier transform processing is performed on the reception symbol stream to obtain the symbol stream in which symbols are lined on the time axis, and the symbols of the low priority data are extracted from the symbol stream so that the low priority data is decoded. Thereby, the same effect as the case described above can be obtained.

Further, the embodiment described above has been dealt with the case where this invention is applied to the portable telephone system. However, this invention is not limited to this, but is applicable to other cellular radio communication system such as automobile telephone system to obtain the same effect as the case described above. In short, in a cellular radio communication system in which a predetermined area is divided into cells of desired size, a base station is provided in each cell, and a mobile station radio-communicates with the base station within the cell where the mobile station exists, the mobile station transmits the transmission signal, in which the sub-carriers on which a message data is superimposed and the sub-carriers on which a preamble data representing the existence and attribute of the message data is superimposed are positioned alternately, via a random access channel. The base station performs a predetermined reception processing on the transmission signal to obtain the reception symbol stream that symbols are lined on the frequency axis, and adds the delayed symbol stream being the reception symbol stream delayed for a predetermined time to the reception symbol stream, so that the signal components relating to the preamble data are extracted. The preamble data is detected based on the signal component to confirm the existence and attribute of the message data. Then, the Fourier transform processing is performed on the reception symbol stream to obtain the symbol stream that symbols are lined on the time axis. The symbols of the message data are extracted from the symbol stream to decode the message data. Thereby, the same effect as the case described above can be obtained.

Besides, in a cellular radio communication system in which a predetermined area is divided into cells of desired size, a base station is provided in each cell, and a mobile station radio-communicates with the base station within the cell where the mobile station exists, the base station transmits the transmission signal, in which the sub-carriers having message data superimposed and the sub-carriers having preamble data representing the existence and attribute of the message data superimposed are positioned alternately, via an initial supplementation channel. The mobile station performs a predetermined reception processing on the transmission signal to obtain the reception symbol stream that symbols are lined on the frequency axis, and adds the delayed symbol stream being the reception symbol stream delayed for a predetermined time to the reception symbol stream, so that the signal components relating to the preamble data are extracted. The preamble data is detected based on the signal components to confirm the existence and attribute of the message data. Then, the Fourier transform processing is performed on the reception symbol stream to obtain the symbol stream that symbols are lined on the time axis. The symbols of the message data are extracted from the symbol stream to decode the message data. Thereby, the same effect as the case described above can be obtained.

As stated above, according to this invention, the sub-carriers on which high priority data is superimposed and the sub-carriers on which low priority data is superimposed are positioned alternately to be transmitted. At the receiving side, the reception symbol stream in which symbols are lined on the frequency axis is obtained by performing a predetermined reception processing. The delayed symbol stream which is the reception symbol stream delayed for a predetermined time is added to the reception symbol stream to extract the signal component relating to the high priority data, so that the high priority data is decoded. Thus, the high priority data can be decoded promptly with a simple configuration, and the processing in accordance with the priority can be performed with a simple configuration even if the high priority data and the low priority data are transmitted at the same time by the multi-carrier method.

Furthermore, in a cellular radio communication system, the sub-carriers on which a message data is superimposed and the sub-carriers on which a preamble data representing the existence and attribute of the message data is superimposed are positioned alternately to be transmitted. At the receiving side, the reception symbol stream in which symbols are lined on the frequency axis is obtained by performing a predetermined reception processing. The delayed symbol stream which is the reception symbol stream delayed for a predetermined time is added to the reception symbol stream to extract the signal components relating to the preamble data. The preamble data is detected based on the signal component to confirm the existence and attribute of the message data. Then, the Fourier transform processing is performed on the reception symbol stream to obtain the symbol stream in which symbols are lined on the time axis. The symbols of the message data are extracted from the symbol stream to decode the message data. Thereby, the preamble data can be detected promptly with a simple configuration, and the processing in accordance with the priority can be performed with a simple configuration even if the preamble data and the message data are transmitted at the same time by the multi-carrier method.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A communication method for transmitting high priority data and low priority data at a same time using a plurality of sub-carriers, said communication method comprising the steps of:

transmitting a transmission signal including first sub-carriers whereon said high priority data is superimposed and second sub-carriers whereon said low priority data is superimposed, said first and said second sub-carriers being positioned alternately;

performing, at a receiving side, a predetermined reception processing on said transmission signal to obtain a first reception symbol stream constituted by a first alignment of symbols on a frequency axis, extracting high priority signal components relating to said high priority data by adding a delayed symbol stream constituted by said first reception symbol stream delayed for a predetermined time to said first reception symbol stream, and decoding said high priority data by correlation value detection from said high priority signal components; and performing a Fourier transform processing on said first reception symbol stream to obtain a second reception symbol stream constituted by a second alignment of said symbols on a time axis, and extracting low priority signal components of said low priority data from said second reception symbol stream for decoding said low priority data.

2. The communication method according to claim 1, wherein said low priority data is predetermined message data and said high priority data is preamble data representing an existence and an attribute of said message data, and at said receiving side, said preamble data is detected based on said high priority signal components relating to said high priority data for confirming said existence and said attribute of said message data and, thereafter, said message data is decoded.

3. The communication method according to claim 1, wherein said correlation value detection includes calculating a correlation value between said high priority signal components and a reference symbol stream.

4. A transmitter for transmission of high priority data and low priority data at a same time using a plurality of sub-carriers to a receiving side, said transmitter comprising:

transmitting means transmitting a transmission signal composed of first sub-carriers whereon said high priority data is superimposed and second sub-carriers whereon said low priority data is superimposed, wherein said first and said second sub-carriers are positioned alternately, and said high priority data includes inherent data set for the receiving side.

5. The transmitter according to claim 4, wherein said low priority data is predetermined message data and said high priority data is preamble data representing an existence and an attribute of said message data.

6. A receiver for receiving a transmission signal transmitted from a transmitter that transmits high priority data and low priority data at a same time using a plurality of sub-carriers, said receiver comprising:

receiving means obtaining a first reception symbol stream constituted by a first alignment of symbols on a frequency axis by performing a predetermined reception processing on said transmission signal composed of first sub-carriers whereon said high priority data is superimposed and second sub-carriers whereon said low priority data is superimposed, said first and said second sub-carriers being positioned alternately;

first demodulating means extracting high priority signal components relating to said high priority data by adding a delayed symbol stream constituted by said first reception symbol stream delayed for a predetermined time to said first reception symbol stream, and decoding said high priority data by correlation value detection from said high priority signal components; and second demodulating means performing Fourier transform processing on said first reception symbol stream to obtain a second reception symbol stream constituted by a second alignment of said symbols on a time axis and extracting low priority signal components of said low priority data from said second reception symbol stream for decoding said low priority data.

7. The receiver according to claim 6, wherein said low priority data is predetermined message data and said high priority data is preamble data representing an existence and an attribute of said message data, and said preamble data is decoded by said first demodulating means for detecting said existence and said attribute of said message data and, thereafter, said message data is decoded by said second demodulating means.

8. The receiver according to claim 6, wherein said correlation value detection performed by said first demodulating means includes calculating a correlation value between said high priority signal components and a reference symbol stream.

9. A cellular radio communication system wherein a predetermined area is divided into cells of a desired size, a base station is provided for each of said cells, and a mobile station radio-communicates with said base station within a cell where said mobile station exists, said cellular radio communication system comprising:

said mobile station including means for transmission of a transmission signal including first sub-carriers whereon message data is superimposed and second sub-carriers whereon preamble data representing an existence and an attribute of said message data is superimposed, said first and said second sub-carriers being positioned alternately, via a random access channel;

said base station including means for performing a predetermined reception processing on said transmission signal to obtain a first reception symbol stream constituted by a first alignment of symbols on a frequency axis, for extracting preamble signal components relating to said preamble data by adding a delayed symbol stream constituted by said first reception symbol stream delayed for a predetermined time to said first reception symbol stream, and for detecting said preamble data by correlation value detection from said preamble signal components; and whereby after said existence and said attribute of said message data are confirmed by detection of said preamble data, Fourier transform processing is performed on said first reception symbol stream to obtain a second reception symbol stream constituted by a second alignment of said symbols on a time axis, and message signal components of said message data are extracted from said second reception symbol stream for decoding said message data.

10. A cellular radio communication system wherein a predetermined area is divided into cells of a desired size, a base station is provided for each of said cells, and a mobile station radio-communicates with said base station within a cell where said mobile station exists, said cellular radio communication system comprising:

said base station includes means for transmission of a transmission signal including first sub-carriers whereon message data is superimposed and second sub-carriers whereon preamble data representing an existence and an attribute of said message data is superimposed, said first and said second sub-carriers being positioned alternately, via an initial supplementation channel;

said mobile station includes means for performing a predetermined reception processing on said transmission signal to obtain a first reception symbol stream constituted by a first alignment of symbols on a frequency axis, for extracting preamble signal components relating to said preamble data by adding a delayed symbol stream constituted by said first reception symbol stream delayed for a predetermined time to said first reception symbol stream, and for detecting said preamble data by correlation value detection from said preamble signal components; and wherein after said existence and said attribute of said message data are confirmed by detection of said preamble data, Fourier transform processing is performed on said first reception symbol stream to obtain a second reception symbol stream constituted by a second alignment of said symbols on a time axis, and message signal components of said message data are extracted from said second reception symbol stream for decoding said message data.

* * * * *